US010614638B2

(12) United States Patent
Carlson et al.

(10) Patent No.: US 10,614,638 B2
(45) Date of Patent: Apr. 7, 2020

(54) DIAGNOSTIC SYSTEMS AND METHODS OF A CONTINUOUSLY VARIABLE TRANSMISSION

(71) Applicant: Polaris Industries Inc., Medina, MN (US)

(72) Inventors: Ryan D. Carlson, Blaine, MN (US); Brian R. Gillingham, Osceola, WI (US); Amery D. Kuhl, North Branch, MN (US); John F. Kallis, Roseau, MN (US); Bruce E. Herrala, Monticello, MN (US); Karl J. Grajkowski, Hudson, WI (US); Jonathon P. Oakden-Graus, Stacy, MN (US); Stephen L. Nelson, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 173 days.

(21) Appl. No.: 15/876,343

(22) Filed: Jan. 22, 2018

(65) Prior Publication Data

US 2018/0211454 A1 Jul. 26, 2018

Related U.S. Application Data

(60) Provisional application No. 62/448,875, filed on Jan. 20, 2017.

(51) Int. Cl.
*G01M 13/02* (2019.01)
*G07C 5/08* (2006.01)
(Continued)

(52) U.S. Cl.
CPC ....... *G07C 5/0808* (2013.01); *B60W 50/0205* (2013.01); *B60W 50/14* (2013.01);
(Continued)

(58) Field of Classification Search
CPC ..... F16H 57/01; G01M 13/02; G01M 13/022; G01M 13/023
(Continued)

(56) References Cited

U.S. PATENT DOCUMENTS 6,188,944 B1 2/2001 Kolmanovsky et al.
6,602,160 B2 8/2003 Tsutsui
(Continued)

FOREIGN PATENT DOCUMENTS

CN 201496045 U 6/2010
CN 203728114 U 7/2014
(Continued)

OTHER PUBLICATIONS

International Search Report and Written Opinion of the International Searching Authority, PCT/US2018/014624 to Polaris Industries Inc., dated Jun. 20, 2018, 20 pages.
(Continued)

*Primary Examiner* — Eric S. McCall
(74) *Attorney, Agent, or Firm* — Faegre Drinker Biddle & Reath LLP

(57) ABSTRACT

A diagnostic system of a vehicle for diagnosing a drive belt of a continuously variable transmission. A diagnostic circuit detects or predicts a fault of the drive belt based on an operating parameter received from a sensor associated with the vehicle during a predetermined diagnostic period.

32 Claims, 11 Drawing Sheets

(51) Int. Cl.
*F16H 57/01* (2012.01)
*F16H 63/50* (2006.01)
*F16H 61/662* (2006.01)
*B60W 50/14* (2020.01)
*B60W 50/02* (2012.01)
*F16H 61/12* (2010.01)
*F16H 9/18* (2006.01)

(52) U.S. Cl.
CPC ............. *F16H 57/01* (2013.01); *F16H 61/12* (2013.01); *F16H 61/662* (2013.01); *F16H 63/50* (2013.01); *G07C 5/0825* (2013.01); *B60W 2510/0652* (2013.01); *F16H 9/18* (2013.01); *F16H 2057/014* (2013.01); *F16H 2061/1208* (2013.01); *F16H 2061/6629* (2013.01)

(58) Field of Classification Search
USPC ...................................................... 73/115.02
See application file for complete search history.

(56) References Cited

U.S. PATENT DOCUMENTS

| | | |
|---|---|---|
| 6,620,076 B1 | 9/2003 | Kawamura et al. |
| 6,622,072 B2 | 9/2003 | Asumi et al. |
| 7,002,454 B1 | 2/2006 | Gustafson |
| 7,029,410 B2 | 4/2006 | Sawada et al. |
| 7,192,383 B2 | 3/2007 | Shimada et al. |
| 7,573,219 B2 | 8/2009 | Kees et al. |
| 7,806,790 B2 | 10/2010 | Iwatsuki et al. |
| 7,974,749 B2 | 7/2011 | Zettel et al. |
| 7,979,176 B2 | 7/2011 | Yurgil et al. |
| 7,988,596 B2 | 8/2011 | Miguchi |
| 8,002,659 B2 | 8/2011 | Ichiba |
| 8,010,266 B2 | 8/2011 | Lee |
| 8,207,840 B2 | 6/2012 | Zhang et al. |
| 8,226,185 B2 | 7/2012 | Jones et al. |
| 8,312,987 B2 | 11/2012 | Lynn et al. |
| 8,447,449 B2 | 5/2013 | Prucka et al. |
| 8,527,167 B2 | 9/2013 | Yamanaka et al. |
| 8,594,898 B2 | 11/2013 | Totsuka |
| 8,604,776 B2 | 12/2013 | Lynn |
| 8,812,206 B2 | 8/2014 | Totsuka et al. |
| 8,914,201 B2 | 12/2014 | Doihara et al. |
| 8,914,204 B2 | 12/2014 | Kodama et al. |
| 8,924,058 B2 | 12/2014 | Jung et al. |
| 8,924,071 B2 | 12/2014 | Stanek |
| 9,240,115 B2 | 1/2016 | Omura et al. |
| 9,347,372 B2 | 5/2016 | Spohn et al. |
| 9,541,013 B2 | 1/2017 | Gauthier et al. |
| 9,633,491 B2 | 4/2017 | Wonderlich |
| 2004/0209719 A1* | 10/2004 | Ochiai .................. B60W 10/06 474/18 |
| 2006/0054128 A1 | 3/2006 | Allyn et al. |
| 2007/0142141 A1 | 6/2007 | Vornehm |
| 2009/0303065 A1 | 12/2009 | Lipowski |
| 2015/0260264 A1 | 9/2015 | Petridis et al. |
| 2016/0076442 A1 | 3/2016 | Spohn et al. |
| 2016/0230886 A1* | 8/2016 | Sasaki .................. F16H 61/662 |

FOREIGN PATENT DOCUMENTS

| | | |
|---|---|---|
| CN | 104828517 A | 8/2015 |
| DE | 102012002693 A1 | 8/2013 |
| EP | 2650571 A1 | 10/2013 |
| FR | 2961573 A1 | 12/2011 |
| WO | WO2013/079530 A1 | 6/2013 |
| WO | WO2013/091039 A1 | 6/2013 |
| WO | WO2016/138285 A1 | 9/2016 |
| WO | WO 2018/136853 | 7/2018 |

OTHER PUBLICATIONS

International Preliminary Report on Patentability issued by the International Bureau of WIPO, dated Jul. 23, 2019, for International Patent Application No. PCT/US2018/014624; 13 pages.

* cited by examiner

DIAGNOSTIC SYSTEMS AND METHODS OF A CONTINUOUSLY VARIABLE TRANSMISSION

RELATED APPLICATION

This application claims the benefit of U.S. Provisional Application No. 62/448,875, filed Jan. 20, 2017, titled DIAGNOSTIC SYSTEMS AND METHODS OF A CONTINUOUSLY VARIABLE TRANSMISSION, the entire disclosure of which is expressly incorporated by reference herein.

FIELD OF THE DISCLOSURE

The present disclosure generally relates to vehicle diagnostic systems, and more particularly to diagnostic systems for a drive belt used in a continuously variable transmission (CVT).

BACKGROUND OF THE DISCLOSURE

Conventional vehicles, including utility vehicles and side-by-side vehicles, have an internal combustion engine that generates drive torque. To drive pistons of the engine, an air/fuel mixture combusts within cylinders and the air/fuel mixture is regulated via intake and exhaust valves. The intake valves are selectively opened to draw air into the cylinders, and the air is mixed with fuel to form the air/fuel mixture. To allow exhaust gas to exit from the cylinders after combustion, the exhaust valves are selectively opened at a specific time.

Continuously variable transmissions (CVTs) are typically installed in recreational vehicles, such as snowmobiles and all-terrain vehicles. The CVT provides an infinite number of different gears that are effective at transmitting torque from the engine to an output driveline of the transmission. The output driveline operatively couples the transmission to at least one ground engaging member.

However, due to a belted construction of the CVT, one of the drawbacks is that a drive belt of the CVT tends to wear out and become damaged prematurely when the drive belt is not broken in properly or used excessively under undesirable conditions. Since the drive belt solely transmits the engine power from a drive pulley to a driven pulley of the CVT, the drive belt is an important component of the CVT. Typically, the CVT drive belt is a V-belt, and is made from rubber, usually fiber-reinforced, that is rigid across but flexible along its length. During operation the drive belt undergoes extreme pressure and friction.

When the drive belt loses pressure between the sheaves of the CVT under high-load or over-load conditions, a slippage may occur causing belt damage, such as a spin-burn or hour-glassing event. For example, during the spin-burn event, a belt temperature may rapidly reach over 200 degrees Fahrenheit (° F.) without any warning, and may continue to rise up to 400° F. if no remedial action is taken. At that point, the drive belt is irreparably damaged, and without replacing the damaged drive belt, the vehicle cannot operate, thereby incurring increased maintenance costs and repair time.

As such, there are opportunities to develop an improved diagnostic system and method that can automatically detect or predict a fault of the drive belt before potential belt damage.

SUMMARY OF THE DISCLOSURE

As discussed in greater detail below, an exemplary diagnostic system provides an enhanced diagnostic function for detecting the fault of the CVT drive belt using various circuits and other related systems. In an exemplary diagnostic system and method the monitoring of the operating parameters and the detecting the fault of the CVT drive belt are performed automatically.

Also included in the present disclosure is a system and method configured for monitoring patterns of operating parameter variations during a predetermined time period based on historical information of a comparative logic or algorithm. Further, the present diagnostic system provides enhanced displays and relations of the operating parameters in real time. Additionally, the operating parameters are displayed automatically without substantial manual interruptions. As a result, the overall operational time of an engine system is enhanced without incurring additional operating expenses and maintenance costs.

In one exemplary embodiment, a vehicle diagnostic method of a vehicle including an internal combustion engine and a continuously variable transmission (CVT) operatively coupled to the internal combustion engine is provided. The method comprising the steps of detecting at least one engine crankshaft acceleration variation event of the vehicle using a detection circuit; determining at least one operating parameter received from one or more sensors associated with an operation of the CVT using a monitoring circuit; and determining based on the at least one operating parameter when the at least one detected engine crankshaft acceleration variation is related to a fault of the drive belt of the CVT using an alert circuit. In one example, the diagnostic method further comprises including an environmental condition parameter as the at least one operating parameter, wherein the environmental condition parameter includes at least one of a fuel state signal, an engine coolant temperature signal, a drive belt temperature signal, and a clutch state signal. In another example, the diagnostic method further comprises including an engine-based parameter as the at least one operating parameter, wherein the engine-based parameter is related to at least one of a crankshaft acceleration signal, an engine torque signal, and a transmission gear position signal. In a further example, the diagnostic method further comprises including a driveline-based parameter as the at least one operating parameter, wherein the driveline-based parameter is related to at least one of a vehicle speed signal, an engine speed signal, and a wheel speed signal. In still another example, the diagnostic method further comprises detecting the at least one engine crankshaft acceleration variation event by measuring an acceleration or deceleration rate of a crankshaft acceleration signal. In yet another example, the diagnostic method further comprises detecting the at least one engine crankshaft acceleration variation event based on a variation pattern of the operating parameter measured during a predetermined time period. In a variation thereof, the diagnostic method further comprises determining whether a frequency of the variation pattern is greater than a predetermined threshold. In another variation thereof the diagnostic method further comprises determining whether a pattern time period of the variation pattern is greater than a predetermined time period. In a refinement of the variation thereof the diagnostic method further comprises determining whether a magnitude of the variation pattern. In a further example, the diagnostic method further comprises performing a first correction method for determining whether the engine crankshaft acceleration variation event is caused by a belt slipping event or an engine combustion misfire event based on a single occurrence of the at least one engine crankshaft acceleration variation event. In a yet further example, the diagnostic method further comprises performing a second correction method for determining whether the engine crankshaft acceleration variation event is caused by a belt slipping event or an engine combustion misfire event based on a plurality of occurrences of the at least one engine crankshaft acceleration variation event.

In another exemplary embodiment, a vehicle diagnostic method of a vehicle including an internal combustion engine and a continuously variable transmission (CVT) operatively coupled to the internal combustion engine is provided. The method comprising determining at least one operating parameter received from one or more sensors associated with an operation of the CVT using a monitoring circuit; detecting at least one belt slipping event of a drive belt of the CVT using a detection circuit; determining based on the at least one operating parameter when the at least one detected belt slipping event is related to an impending fault of the drive belt of the CVT using an alert circuit; and notifying the impending fault of the drive belt before belt or driveline damage of the vehicle occurs using the alert circuit. In one example, the diagnostic method further comprises generating an information signal related to the impending fault of the drive belt. In another example, the diagnostic method further comprises providing an option to override a user input by adjusting at least one value of the at least one operating parameter. In a further example, the diagnostic method further comprises detecting the at least one belt slipping event by the detection circuit in at least one of a retroactive control mode and an active control mode. In yet another example, the diagnostic method further comprises receiving a desired vehicle input parameter using the monitoring circuit. In still another example, the diagnostic method further comprises including an environmental condition parameter as the at least one operating parameter. In yet still another example, the diagnostic method further comprises including an engine-based parameter as the at least one operating parameter. In yet a further example, the diagnostic method further comprises including a driveline-based parameter as the at least one operating parameter. In still yet a further example, the diagnostic method further comprises detecting the belt slipping event based on a comparison of an engine-based parameter and a driveline-based parameter for predicting the impending fault of the drive belt. In a variation thereof, the diagnostic method further comprises determining whether at least one of the engine-based parameter and the driveline-based parameter is greater than a predetermined threshold. In a further still example, the diagnostic method further comprises informing the at least one detected belt slipping event using a display; and automatically adjusting the at least one operating parameter based on a predetermined table.

In a further exemplary embodiment, a vehicle diagnostic method of a vehicle including an internal combustion engine and a continuously variable transmission (CVT) operatively coupled to the internal combustion engine is provided. The method comprising the steps of: determining at least one operating parameter received from one or more sensors associated with an operation of the CVT using a monitoring circuit; detecting at least one critical belt life event of a drive belt of the CVT using a detection circuit; determining based on the at least one operating parameter when the at least one detected critical belt life event is related to a fault of the drive belt of the CVT using an alert circuit; and generating an information signal related to a life of the drive belt using the alert circuit. In an example, the diagnostic method further comprises including an environmental condition parameter as the at least one operating parameter, wherein the environmental condition parameter includes a temperature signal. In a further example, the diagnostic method further comprises including an engine-based parameter as the at least one operating parameter, wherein the engine-based parameter is related to at least one of an engine load signal, a throttle position signal, an engine torque signal, and an engine power signal. In yet a further example, the diagnostic method further comprises including a driveline-based parameter as the at least one operating parameter, wherein the driveline-based parameter is related to at least one of a vehicle speed signal and an engine speed signal. In still a further example, the diagnostic method further comprises detecting the critical belt life event based on a comparison of an engine-based parameter, a driveline-based parameter, and an environmental condition parameter; and predicting a remaining life of the drive belt based on the comparison. In a variation thereof, the diagnostic method further comprises determining whether the remaining life of the drive belt is less than a predetermined threshold. In another variation thereof, the diagnostic method further comprises displaying the information signal on a display using a textual or graphical indicator associated with the remaining life of the drive belt. In another example, the diagnostic method further comprises adjusting at least one of an engine-based parameter, a driveline-based parameter, and an environmental condition parameter based on the at least one detected critical belt life event.

In a further exemplary embodiment of the present disclosure, a vehicle diagnostic method of a vehicle including an internal combustion engine and a continuously variable transmission (CVT) operatively coupled to the internal combustion engine is provided. The method comprising the steps of: determining an amount of input energy provided to the CVT by the internal combustion engine; determining an amount of output thermal energy leaving the CVT; determining based on the amount of input energy and the amount of output thermal energy an amount of accumulated energy in the CVT; comparing the amount of accumulated energy to a threshold; and reducing the amount of input energy in response to the amount of accumulated energy satisfying the threshold. In an example thereof, the step of reducing the amount of input energy includes the step of reducing the power provided by the internal combustion engine to the CVT. In another example, the amount of input energy is determined based on mechanical input characteristics to the CVT. In yet another example, the amount of output thermal energy is determined based on fluid characteristics of the CVT. In still another example, the step of determining the amount of input energy provided to the CVT by the internal combustion engine includes the steps of: determining an output power of the internal combustion engine; determining a CVT clutch efficiency based on the determined output power; and determining the amount of input energy provided to the CVT based on the determined output power and the determined CVT clutch efficiency. In a variation thereof, the step of determining the CVT clutch efficiency based on the determined output power includes the step of retrieving from a database the determined CVT clutch efficiency. In yet still another example, the step of determining the amount of output thermal energy leaving the CVT includes the steps of: determining an air temperature of air entering an interior of the CVT; and determining the amount of output thermal energy leaving the CVT based on a CVT clutch airflow model, a heat transfer coefficient, and the determined air temperature.

In a yet further exemplary embodiment of the present disclosure, a vehicle diagnostic method of a vehicle including an internal combustion engine and a continuously variable transmission (CVT) operatively coupled to the internal combustion engine. The method comprising the steps of: detecting a plurality of engine crankshaft acceleration variation events; determining a frequency of the plurality of engine crankshaft acceleration variation events; determining a CVT belt interaction frequency of a drive belt of the CVT; and classifying the plurality of engine crankshaft acceleration variation events as one of an engine misfire event and a CVT belt damage event based on a comparison of the frequency to the CVT belt interaction frequency. In an example thereof, the step of determining the CVT belt interaction frequency of the drive belt of the CVT includes the steps of: determining a pitch diameter of a drive clutch of the CVT; determining a linear speed of the drive belt of the CVT based on the determined pitch diameter of the drive clutch and a rotational speed of a drive shaft of the CVT; and determining the CVT belt interaction frequency of the drive belt based on the determined linear speed of the drive belt of the CVT and a length of the belt.

Additional features and advantages of the present disclosure will become apparent to those skilled in the art upon consideration of the following detailed description of the illustrative embodiment exemplifying the best mode of carrying out the invention as presently perceived.

BRIEF DESCRIPTION OF THE DRAWINGS

The embodiments will be more readily understood in view of the following description when accompanied by the below figures and wherein like reference numerals represent like elements, wherein.

Figure 1:
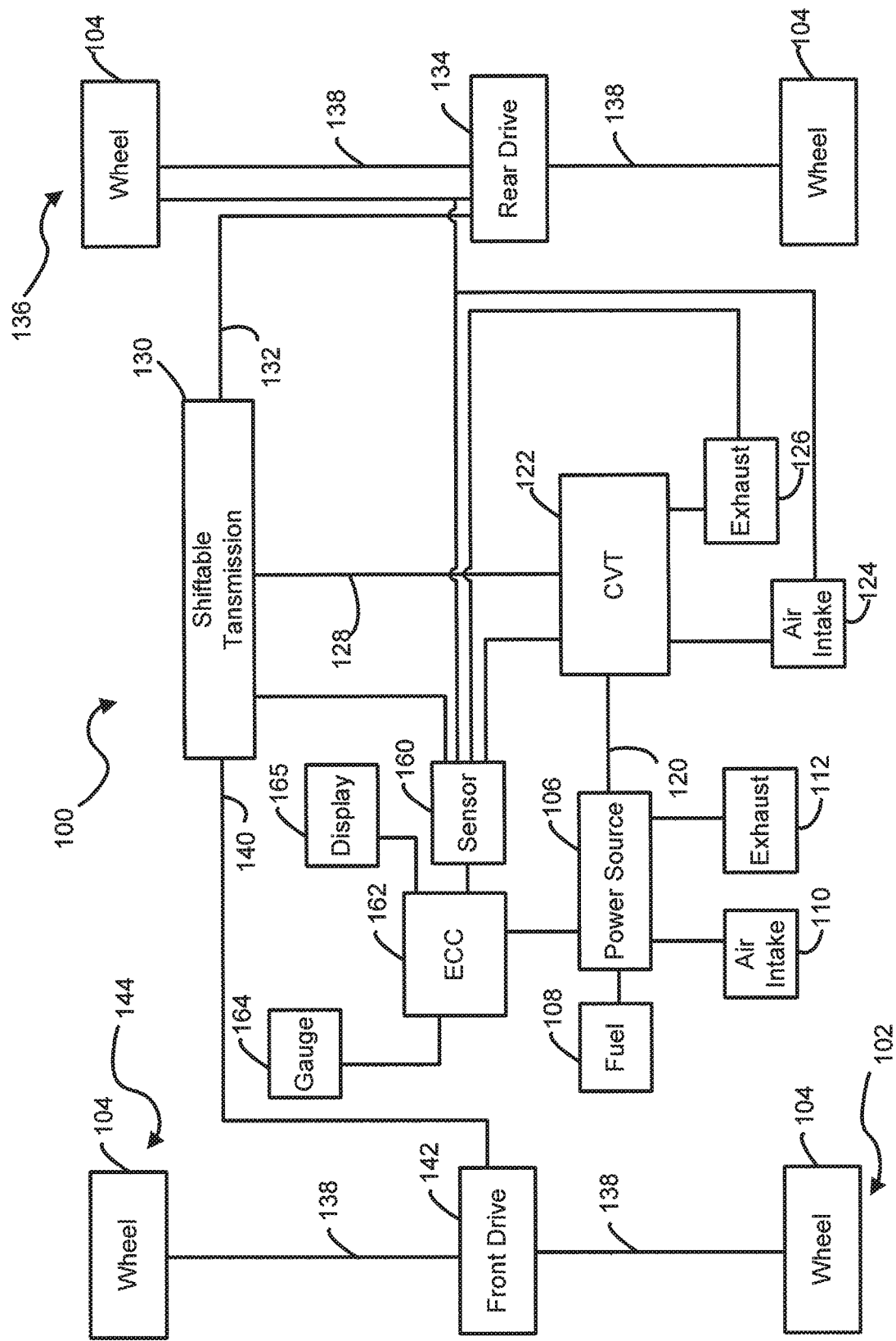
FIG. 1 illustrates a representative view of a drive train of an exemplary side-by-side vehicle.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate an exemplary embodiment of the disclosure, in one form, and such exemplifications are not to be construed as limiting the scope of the disclosure in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a continuously variable transmission ("CVT"), it should be understood that the features disclosed herein may be incorporated into one or more vehicles. Exemplary vehicles include all-terrain vehicles, side-by-side UTVs, utility vehicles, motorcycles, snowmobiles, golf carts, and other vehicles or devices incorporating a continuously variable transmission.

Referring now to FIG. 1, a representative view of a vehicle 100 is shown. Vehicle 100 as illustrated includes a plurality of ground engaging members 102. Illustratively, ground engaging members 102 are wheels 104 with associated tires. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

One or more of ground engaging members 102 are operatively coupled to a shiftable transmission 130 to power the movement of vehicle 100. Other suitable types of transmission, such as non-shiftable gear sets, are also contemplated. Exemplary power sources 106 include internal combustion engines and electric motors. In the illustrated embodiment, the power source 106 is an internal combustion engine.

An internal combustion power source 106 is represented in FIG. 1. Power source 106 receives fuel from a fuel source 108 and ambient air from an air intake system 110. For example, the ambient air is selectively supplied to the power source 106 to be mixed with the fuel for internal combustion. Exhaust is expelled from power source 106 through an exhaust system 112. An output shaft 120 of power source 106 is coupled to a drive member of a continuously variable transmission ("CVT unit") 122. A driven member of the CVT unit 122 is operatively coupled to the drive member of the CVT unit 122 through a drive belt. CVT unit 122 receives ambient air through an air intake system 124 and expels air from an interior of CVT unit 122 through an exhaust system 126. The driven member is coupled to an output shaft 128 which is operatively coupled to an input of a shiftable transmission 130.

A first output shaft 132 of shiftable transmission 130 is coupled to a rear drive unit 134. Rear drive unit 134 is coupled to corresponding wheels 104 of a rear axle 136 through half shafts 138. Rear drive unit 134 may be a differential. A second output shaft 140 of shiftable transmission 130 is coupled to a front drive unit 142. Front drive unit 142 is coupled to corresponding wheels 104 of a front axle 144 through half shafts 138. Front drive unit 142 may be a differential.

Various configurations of rear drive unit 134 and front drive unit 142 are contemplated. Regarding rear drive unit 134, in one embodiment rear drive unit 134 is a locked differential wherein power is provided to both of the wheels of axle 136 through output shafts 150. In one embodiment, rear drive unit 134 is a lockable/unlockable differential relative to output shafts 150. When rear drive unit 134 is in a locked configuration power is provided to both wheels of axle 136 through output shafts 150. When rear drive unit 134 is in an unlocked configuration, power is provided to one of the wheels of axle 136, such as the wheel having the less resistance relative to the ground, through output shafts 150. Regarding front drive unit 142, in one embodiment front drive unit 142 has a first configuration wherein power is provided to both of the wheels of front axle 144 and a second configuration wherein power is provided to one of the wheels of axle 144, such as the wheel having the less resistance relative to the ground.

In one embodiment, front drive unit 142 includes active descent control ("ADC"). ADC is a drive system that provides on-demand torque transfer to the front wheels when one of the wheels 104 of rear axle 136 lose traction and that provides engine braking torque to the wheels 104 of front axle 144. Both the on-demand torque transfer and the engine braking feature of front drive unit 142 may be active or inactive. In the case of the on-demand torque transfer, when active, power is provided to both of the wheels of front axle 144 and, when inactive, power is provided to one of the wheels of front axle 144. In the case of the engine braking, when active, engine braking is provided to the wheels of front axle 144 and, when inactive, engine braking is not provided to the wheels of front axle 144. Other suitable arrangements are contemplated for a two wheel drive system to suit the application. Exemplary front drive units are disclosed in U.S. patent application Ser. No. 12/816,052, filed Jun. 15, 2010, titled ELECTRIC VEHICLE, U.S. Pat. No. 5,036,939, and U.S. Pat. RE38,012E, the disclosures of which are expressly incorporated herein by reference.

In one embodiment, one or more of CVT unit 122, air intake system 124, and exhaust system 126 includes a sensor 160 which monitors a characteristic of the air within the interior of the respective CVT unit 122, air intake system 124, and exhaust system 126. In the illustrated embodiment, multiple sensors 160 are operatively and communicably connected to the transmission 130, the wheel 104, the air intake system 124, the exhaust system 126, and the CVT unit 122 for receiving signals from at least one of the connected sensors. Exemplary sensors include a temperature sensor, a speed sensor, and a load sensor. In one embodiment, sensors 160 provide an indication of a temperature of the air within the interior of the respective CVT unit 122, air intake system 124, and exhaust system 126 to an engine control circuit (ECC) 162 which includes logic to control the operation of power source 106. When a monitored air temperature exceeds a threshold amount, ECC 162 responds by at least one of limiting an output speed of output shaft 120 of power source 106, limiting a speed of vehicle 100, and indicating an overheat condition to an operator of vehicle 100 through a user interface, such as a gauge 164 or display 165, within an operator area of vehicle 100. Exemplary user interfaces are disclosed in U.S. patent application Ser. No. 15/161,720, filed May 23, 2016, titled DISPLAY SYSTEMS AND METHODS FOR A RECREATIONAL VEHICLE, the entire disclosure of which is expressly incorporated by reference. Exemplary indicators of an overheat condition include a light, a warning message on a display 165, and other suitable ways of communicating a condition to an operator. By limiting an engine speed or a vehicle speed, the temperature of the air in an interior of CVT unit 122 is reduced and a temperature of a drive belt in the interior of CVT unit 122 is reduced. This reduces the risk of a drive belt failure.

Figure 2:
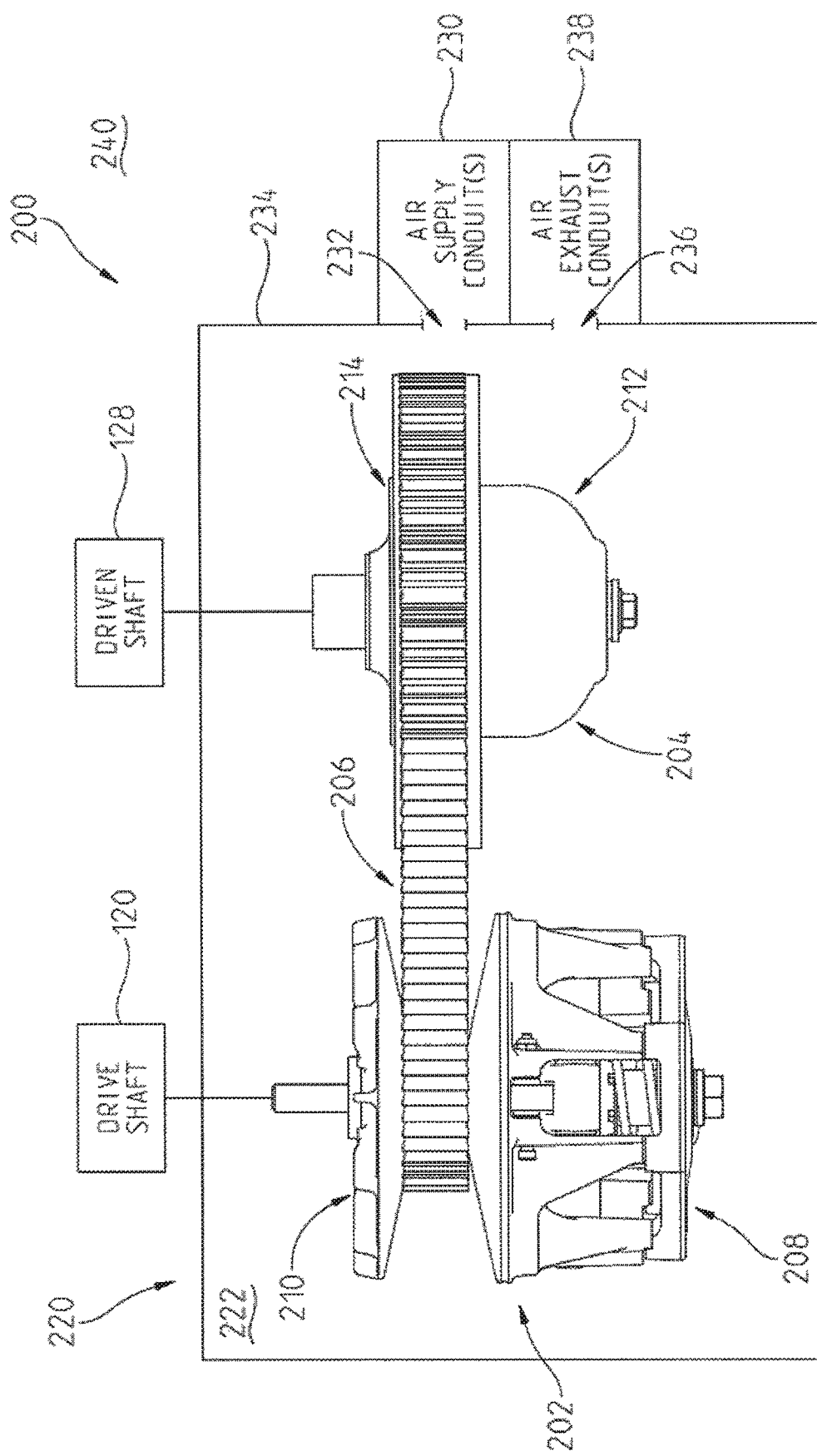
FIG. 2 illustrates a representative view of initial air flow to an exemplary continuous variable transmission (CVT)

Referring to FIG. 2, an exemplary continuously variable transmission 200 is represented. Continuously variable transmission 200 includes a drive clutch 202 operatively coupled to output shaft 120, a driven clutch 204 operatively coupled to output shaft 128, and a drive belt 206 operatively coupled to drive clutch 202 and driven clutch 204 to transfer power from drive clutch 202 to driven clutch 204. Drive clutch 202 includes a first drive clutch sheave 208 and a second drive clutch sheave 210 moveable relative to the first drive clutch sheave 208. Driven clutch 204 includes a first driven clutch sheave 212 and a second driven clutch sheave 214 moveable relative to the first driven clutch sheave 212.

Both of drive clutch 202 and driven clutch 204 are positioned within a housing 220 having an interior 222. Housing 220 may be comprised of multiple components which cooperate to form housing 220. The multiple components may also include features to direct air flow through interior 222 of housing 220. In one example, housing 220 includes a base having a first opening adapted to receive the drive shaft 120 and a second opening adapted to receive the driven shaft 128 and a cover coupled to the base. The cover and the base cooperating to define interior 222 of the housing 220. The cover and base may include features to direct air flow through interior 222 of housing 220.

As represented in FIG. 2, one or more air supply conduits 230 are coupled to housing 220. Exemplary air supply conduits include hoses. In one embodiment, each air supply conduit 230 provides air to the interior 222 of housing 220 through a respective air supply opening 232 in an exterior 234 of housing 220. The air supply conduits 230 provide air to the interior 222 of housing 220 to cool drive clutch 202, driven clutch 204, and drive belt 206. As a result, this configuration provides a cooling effect on the drive belt 206. The supplied air is directed towards one or more of first drive clutch sheave 208, second drive clutch sheave 210, first driven clutch sheave 212, and second driven clutch sheave 214 whereat, the supplied air will take on heat to cool the respective one or more of first drive clutch sheave 208, second drive clutch sheave 210, first driven clutch sheave 212, and second driven clutch sheave 214. The air will then circulate within interior 222 of housing 220 potentially or intentionally contacting one or more of first drive clutch sheave 208, second drive clutch sheave 210, first driven clutch sheave 212, and second driven clutch sheave 214 and then exiting interior 222 of housing 220 through one or more air exhaust openings 236 in wall 234 of housing 220. One or more exhaust or outlet conduits 238 are coupled to the exhaust openings 236.

Figure 3:
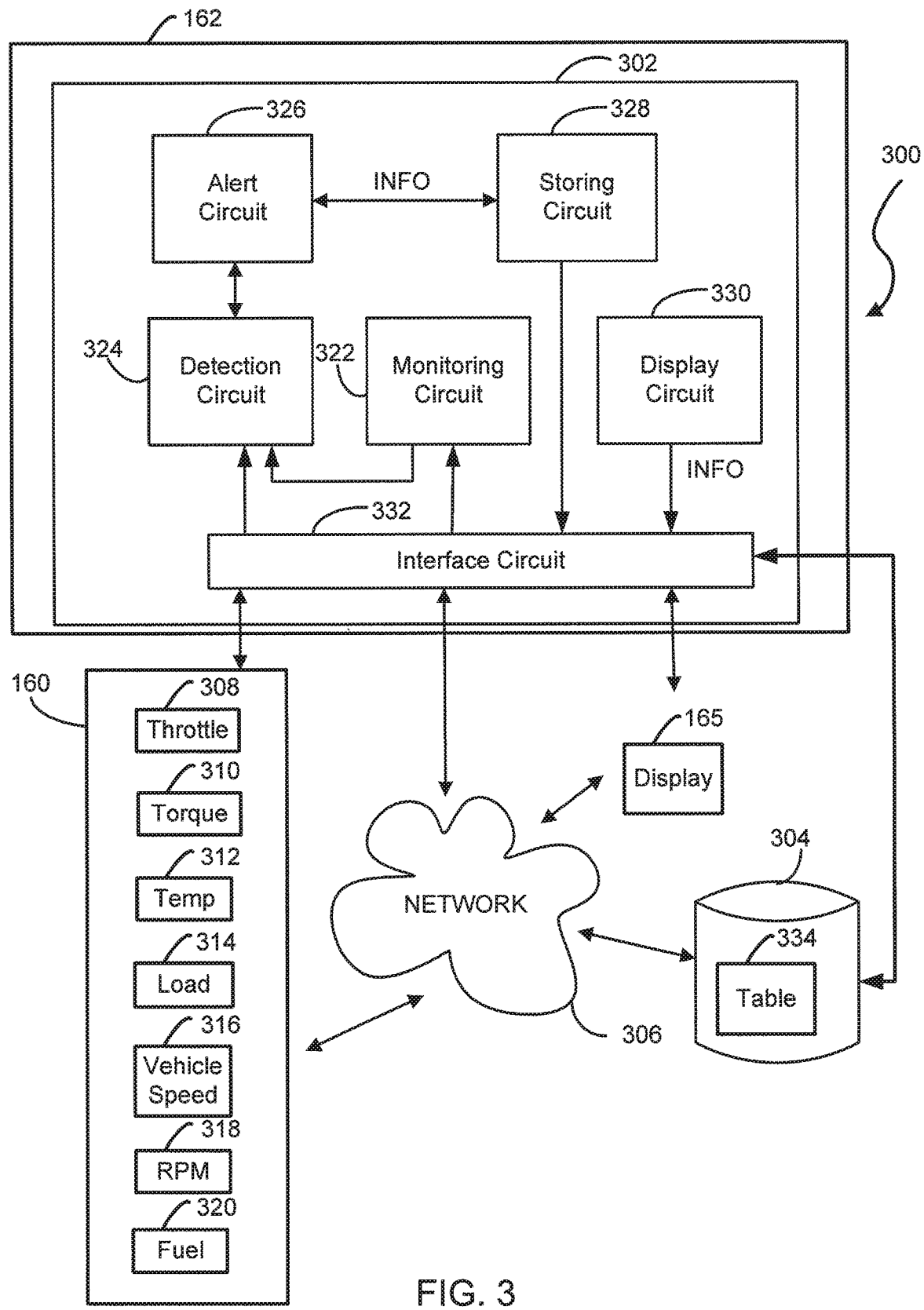
FIG. 3 illustrates an exemplary block diagram and schematic view of one illustrative embodiment of a diagnostic system having an engine control circuit and a diagnostic circuit.

Referring now to FIG. 3, an exemplary schematic view of a diagnostic system 300 is shown. Included in the diagnostic system 300 is the engine control circuit (ECC) 162 having a diagnostic circuit (DC) 302. The DC 302 is configured to detect or predict a fault of the drive belt 206 of the CVT 122 based on at least one operating parameter, such as an engine or vehicle parameter or signal. Although the DC 302 is shown inside the ECC, the DC may be independent or separate from the ECC or incorporated into any other systems of the vehicle 100 to suit the application.

The fault of the drive belt 206 may refer to a deteriorating condition of the drive belt caused by the spin-burn or hour-glassing event. For example, during a substantial rotation of the drive sheaves relative to the near stationary drive belt, a slip in the drive belt 206 may create the hour-glassing event, changing side profiles of the drive belt 206 into an hour-glass shape. As an example only, when the wheels 104 are stuck in a ditch or a loose soil, such as mud or snow, an engine speed may increase but a wheel speed may decrease down to almost zero. Such lack of rotational movement of the wheels 104 may cause the driven shaft 128 to stop and cause the hour-glassing event on the drive belt 206.

In the illustrated embodiment, the DC 302 is microprocessor-based and includes a non-transitory computer readable medium or database 304 which includes processing instructions stored therein that are executable by the microprocessor of DC 302 to control operation of a diagnostic process of the CVT 122. A non-transitory computer-readable medium, or memory, may include random access memory (RAM), read-only memory (ROM), erasable programmable read-only memory (e.g., EPROM, EEPROM, or Flash memory), or any other tangible medium capable of storing information. For example, a predetermined calibration or empirical lookup table may be stored on a volatile or non-volatile memory for subsequent access.

Exemplary operating parameters relate to an engine speed (e.g., revolutions per minute (RPM)), an engine load (e.g., units of percentage relative load (% RL)), a throttle position (e.g., a throttle position percentage), an engine torque (e.g., inch-pounds or inch-ounces), an engine power and the like. Other suitable operating parameters are also contemplated to suit different applications. Detailed descriptions of exemplary operating parameters and signals are provided below in paragraphs relating to FIGS. 4-7.

As used herein, the term "circuit" or "unit" may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the circuits, the scope of the present system should not be so limited since other modifications will become apparent to the skilled practitioner.

The term "logic" as used herein includes software and/or firmware executing on one or more circuits. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein.

This disclosure contemplates other embodiments in which the DC 302 is not microprocessor-based, but rather is configured to regulate operation of the diagnostic process of the CVT 122 based on one or more sets of hardwired instructions and/or software instructions stored in the database 304. Further, the DC 302 may be contained within a single device or be a plurality of devices networked together to provide the functionality described herein.

During the diagnostic process, the DC 302 regulates an overall diagnostic operation of the present system 300. In general, the DC 302 monitors at least one of the operating parameters or signals for diagnosing the drive belt 206 of the CVT 122 via a network 306, such as a controller area network (CAN) bus. Any type of network having a collection of networkable devices, such as computers, servers, and other hardware interconnected by communication channels is contemplated. Exemplary networks include wired or wireless networks or combinations thereof. Exemplary networks may include Bluetooth enabled networks or Wi-Fi enabled networks.

Also included in the diagnostic system 300 are one or more sensors 160, such as a throttle position sensor 308, an engine torque sensor 310, a temperature sensor 312, an engine load sensor 314, a vehicle speed sensor 316, an engine RPM sensor 318, a fuel sensor 320, and the like. Such sensors 160 are operatively connected to the DC 302 via the network 306 using the user interface, such as the gauge 164 or display 165, and configured for measuring operating characteristics and conditions of the vehicle 100. During operation, related information of the operating parameters or signals is displayed on the display 165 accessible to a user via the network 306. It is contemplated that the user may refer to an operator or any other system associated with the diagnostic system 300. The DC 302 manages interactions between the user and the DC 302 by way of a human machine interface (HMI), such as a gauge interface, a keyboard, a touch sensitive pad or screen, a mouse, a trackball, a voice recognition system, and the like. The display 165 (e.g., textual and graphical) is configured for receiving an input data from the user and/or the DC 302.

In one embodiment, the user uses an input device, such as the HMI, to graphically or textually interact with the present system 300. Associated data and/or parameters are generally received in the DC 302 and then transferred to the display 165 via a dedicated or shared communication system via the network 306. Further, any collaborative or third-party database reachable by the DC 302 can also be used as part of the diagnostic system 300.

Referring now to FIG. 3, it is preferred that the DC 302 includes a monitoring circuit 322, a detection circuit 324, an alert circuit 326, a storing circuit 328, and a display circuit 330. Although these sub-circuits 322-330 are illustrated as children circuits subordinate of the parent circuit DC 302, each sub-circuit can be operated as a separate unit from the DC, and other suitable combinations of sub-circuits are contemplated to suit different applications. One or more circuits or units can be selectively bundled as a key software model running on the processor having software as a service (SSaS) features.

All relevant information can be stored in the database 304, e.g., as a non-transitory data storage device and/or a machine readable data storage medium carrying computer-executable instructions, for retrieval by the DC 302 and its children circuits. Also included in the DC 302 is an interface circuit 332 for providing an interface between the DC 302, the database 304, the network 306, the sensors 160, and the display 165 of the vehicle 100. It is preferred that the interface circuit 332 provides electrical interconnections for performing diagnostic operation of, for example, the network 306, the display 165, and other related system devices, services, and applications.

The other devices, services, and applications may include, but are not limited to, one or more software or hardware components, etc., related to the DC 302. The interface circuit 332 also receives operating data or parameters related to the vehicle 100 from the sensors 160 or other related systems, which are communicated to the respective circuits, such as the DC 302, and its children circuits.

The monitoring circuit 322 is configured to receive the operating data and parameters via the interface circuit 332, and provide operating condition or characteristic information about the vehicle 100. Specifically, the monitoring circuit 322 provides detailed information of the engine or vehicle conditions, such as temperature, speed and power of the vehicle 100, relative to the CVT 122 using the sensors 160. In general, as discussed in greater detail below, diagnostic system 300 assesses its operational characteristics by evaluating the engine or vehicle operating conditions.

The detection circuit 324 is configured to receive the operating data and parameters from the network 306 via the interface circuit 332, and to examine the received operating data and parameters for diagnosing the drive belt 206 based on a predetermined set of rules or algorithms. During operation, the detection circuit 324 recognizes or identifies a predetermined triggering event caused by a condition change of the CVT 122, the power source 106, and/or the vehicle 100, and identifies or detects the fault of the drive belt 206 based on the triggering event. Exemplary triggering events are described in paragraphs below relating to FIGS. 4-7.

The alert circuit 326 is configured to generate an information signal or message INFO to inform the user or other users of the detected triggering event by converting the triggering event into a meaningful message recognizable by the user. More specifically, one or more triggering events are transformed by the alert circuit 326 into warning or status signals of the drive belt 206. Subsequently, the warning or status signals are delivered to the display 165, a mobile device, or any other computing device to alert the user or other users. It is also contemplated that when the triggering event is detected, the alert circuit 326 provides an option to override the user input by adjusting one or more values of the operating parameters to prevent damage to the drive belt 206, thereby alleviating the triggering event. Exemplary information signals are described in paragraphs below relating to FIGS. 4-7. In one embodiment a user input is provided to opt out of one or more processing sequences disclosed herein to provide operator flexibility of vehicle performance.

The storing circuit 328 is configured to digitally store relevant information related to the present diagnostic system 300 in the database 304. More specifically, the database 304 includes the operating data and parameters related to analysis data about the triggering events for the purposes of research, development, improvement of the comparative logic or algorithms and further investigations by the user or the related systems.

The display circuit 330 is configured to retrieve from the database 304 and interactively display an appropriate status or information message associated with the information signal INFO generated based on the triggering event for illustration on the display 165. An instance report related to each information signal INFO and the corresponding triggering event is graphically or textually generated by the display circuit 330 in real time. In one embodiment, the information is automatically transmitted to a central server, other vehicles, or any other suitable systems, as desired.

Referring now to FIGS. 4-7, exemplary processing sequences of executing the present diagnostic system 300 is illustrated. Although the following steps are primarily described with respect to the embodiments of FIGS. 1-3, it should be understood that the steps within the processing sequences may be modified and executed in a different order or sequence without altering the principles of the present disclosure.

Figure 4:
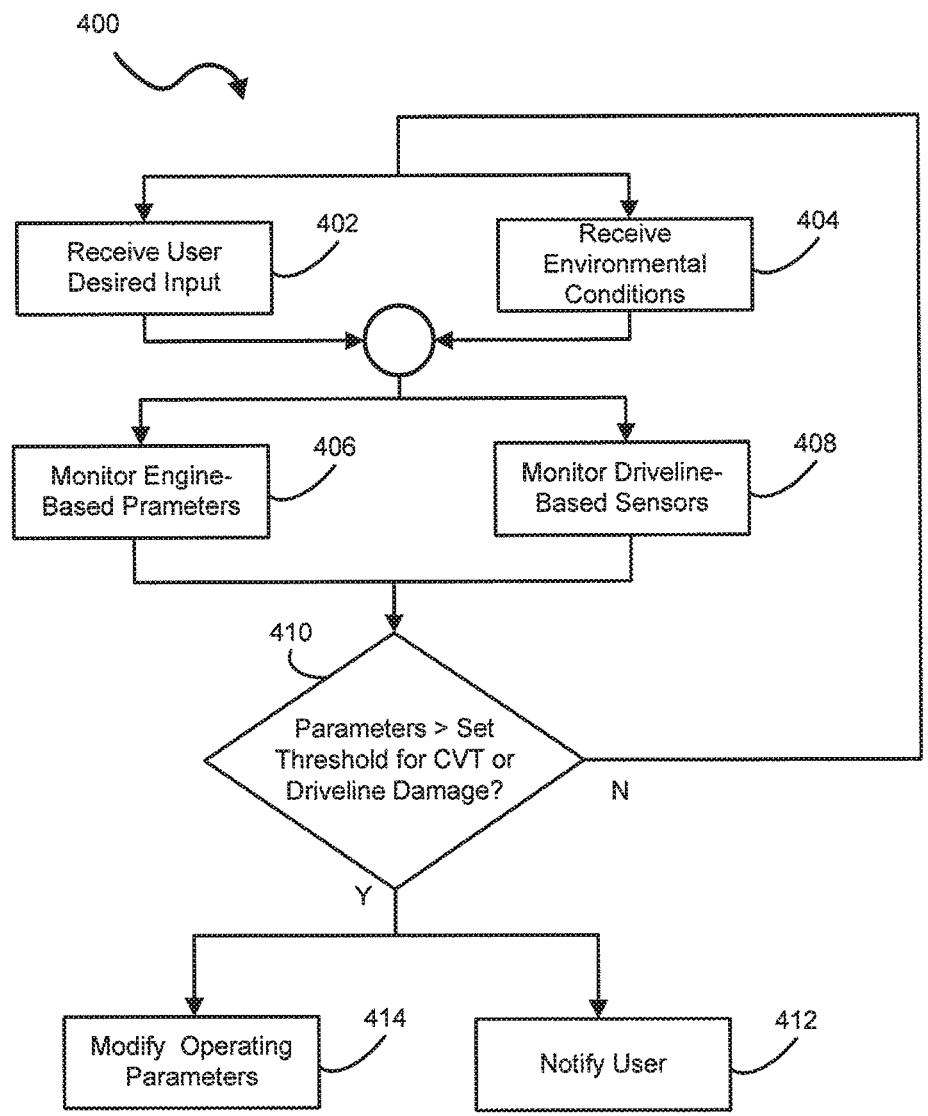
FIG. 4 illustrates an exemplary processing sequence of executing the present diagnostic system for detecting a belt slipping event in a retroactive control mode.

FIG. 4 illustrates an exemplary processing sequence of a belt slipping event detection logic 400 of the diagnostic system 300 in a retroactive control mode. The belt slipping event is one of the triggering events detected by the detection circuit 324. In the retroactive control mode, when the belt slipping event is detected, the alert circuit 326 has an option to notify the user of the fault of the drive belt 206, or automatically adjust at least one operating parameter to remove or lessen the effect of the fault for continuous operation of the vehicle 100 without interruption.

In the illustrated embodiment, steps 402 and 404 are performed simultaneously, but each step may be performed separately or individually independent from each other. In step 402, the monitoring circuit 322 receives a desired vehicle input signal or parameter from the user, such as a predetermined throttle position parameter, for opening and closing a throttle control valve, from the throttle position sensor 308, or a predetermined engine torque parameter from the engine torque sensor 310.

In step 404, the monitoring circuit 322 receives an environmental condition parameter or signal from the vehicle 100, such as a temperature signal from the temperature sensor 312 configured to measure temperature of the drive belt 206 or air temperature of the CVT 122. For example, the temperature sensor 312 may be disposed in the air supply conduit 230, the air exhaust conduit 238, or directly on or near the drive belt 206 using an infrared sensor. Other exemplary environmental condition signals include an engine manifold temperature, pressure or vacuum signal, a motion signal, a crankshaft acceleration signal, a transmission gear position signal, a CVT reduction rate signal, a driveline strain or torque signal, a steering angle signal, a steering rack displacement signal, and the like.

Additional suitable environmental condition signals are also contemplated as needed. For example, in another embodiment, the monitoring circuit 322 may receive a road load condition, such as a hard ground condition, a loose sandy condition, and the like, by detecting the road load condition using the sensor 160 or receiving the road load condition inputted by the user for applying the road load condition as one of the environmental condition signals.

It is preferred that steps 406 and 408 are performed simultaneously, but each step may be performed separately or individually independent from each other. In step 406, the monitoring circuit 322 receives and monitors at least one engine-based parameter, such as an engine load signal (e.g., % RL) from the engine load sensor 314, a throttle position signal (e.g., a throttle position percentage) from the throttle position sensor 308, or an engine torque signal (e.g., inch-pounds or inch-ounces) from the engine torque sensor 310. Other exemplary engine-based parameters include an engine power parameter, a transmission speed parameter, a crankshaft rotation or position parameter, an engine control unit (ECU) internal clock parameter, a crankshaft acceleration parameter, and the like, as received from each corresponding sensor 160.

In step 408, the monitoring circuit 322 monitors at least one driveline-based parameter, such as a vehicle speed parameter (e.g., miles/hour) from the vehicle speed sensor 316 or an engine speed parameter (e.g., RPM) from the engine speed sensor 318. Other exemplary driveline-based parameters include parameters received from an infrared sensor, a global positioning system sensor, a laser sensor, an ultrasonic sensor, a steering angle sensor, a steering rack displacement sensor, a gear position sensor, and the like. Other suitable chassis-based parameters are also contemplated to suit the application.

In step 410, the detection circuit 324 detects the belt slipping event based on a comparison of at least one of the engine-based and driveline-based parameters with a predetermined threshold for preventing damage related to the drive belt 206 of the CVT 122 or an output driveline of the transmission 130. Any combinations of the engine-based and driveline-based parameters are considered to detect the belt slipping event. For example, when a rotational speed ratio between the drive shaft 120 and the driven shaft 128 is 4:1 and an engine load is at 10-20% for a predetermined time period, e.g., 5 seconds, then the belt slipping event is suspected. As another example, when the rotational speed ratio between the drive shaft 120 and the driven shaft 128 is 7:1 and the engine load is at approximately 50% or greater for a predetermined time period, e.g., 1 second, then the belt slipping event may be in progress. When the at least one of the engine-based and driveline-based parameter is greater than the predetermined threshold, control proceeds to at least one of step 412 and step 414 depending on the application. Otherwise, control returns to steps 402 and 404.

For example only, the belt slipping event F(slip) may be defined by a function of time and at least one of the engine-based and driveline-based parameters, as provided by expression (1):

$$F(\text{slip}) = T \cdot \text{Parm} \qquad (1)$$

wherein T denotes a time period and Parm denotes the at least one of the engine-based and driveline-based parameters. As an example, the belt slipping event may be detected by the detection circuit 324 when the engine RPM and the driveline speed parameters exceeding the predetermined threshold continue for a predetermined time period while the vehicle 100 is in a park or neutral position. An exemplary time period may range from 1 second to 5 seconds.

It is preferred that steps 412 and 414 are performed simultaneously, but each step may be performed separately or individually independent from each other. In step 412, the alert circuit 326 generates the information signal INFO based on the detected triggering event, the belt slipping event, to inform the user of the triggering event using the display 165. For example, the information signal INFO is displayed using a dashboard light or an audible signal including a textual or graphical indicator (e.g., a symbol or icon) on the display 165. Other suitable audio, visual, or tactile indicators are also contemplated.

In step 414, the alert circuit 326 automatically adjusts or modifies at least one of the operating parameters based on a predetermined calibration or empirical lookup table 334 stored in the database 304, such as the desired vehicle input parameters, the environmental condition parameters, the engine-based parameters, or the driveline-based parameters, to prevent or lessen the potential CVT or driveline damage. For example, when the detection circuit 324 identifies the belt slipping event, the alert circuit 326 automatically reduces the engine speed, the engine torque, the engine load, or the throttle position percentage, by a predetermined value. Other suitable adjustments or modifications of the operating parameters are contemplated to suit different applications. In one embodiment, the automatic adjustment step may be optionally turned ON or OFF as desired, and a progressive warning system may be utilized to gradually warn the user of the potential CVT or driveline damage using a color, hue, and saturation intensity technique. For example, a yellow light may indicate a low level warning suggesting the user to change to a lower gear, but a red light may indicate a high level warning automatically reducing the engine load or speed to a predetermined value.

Figure 5:
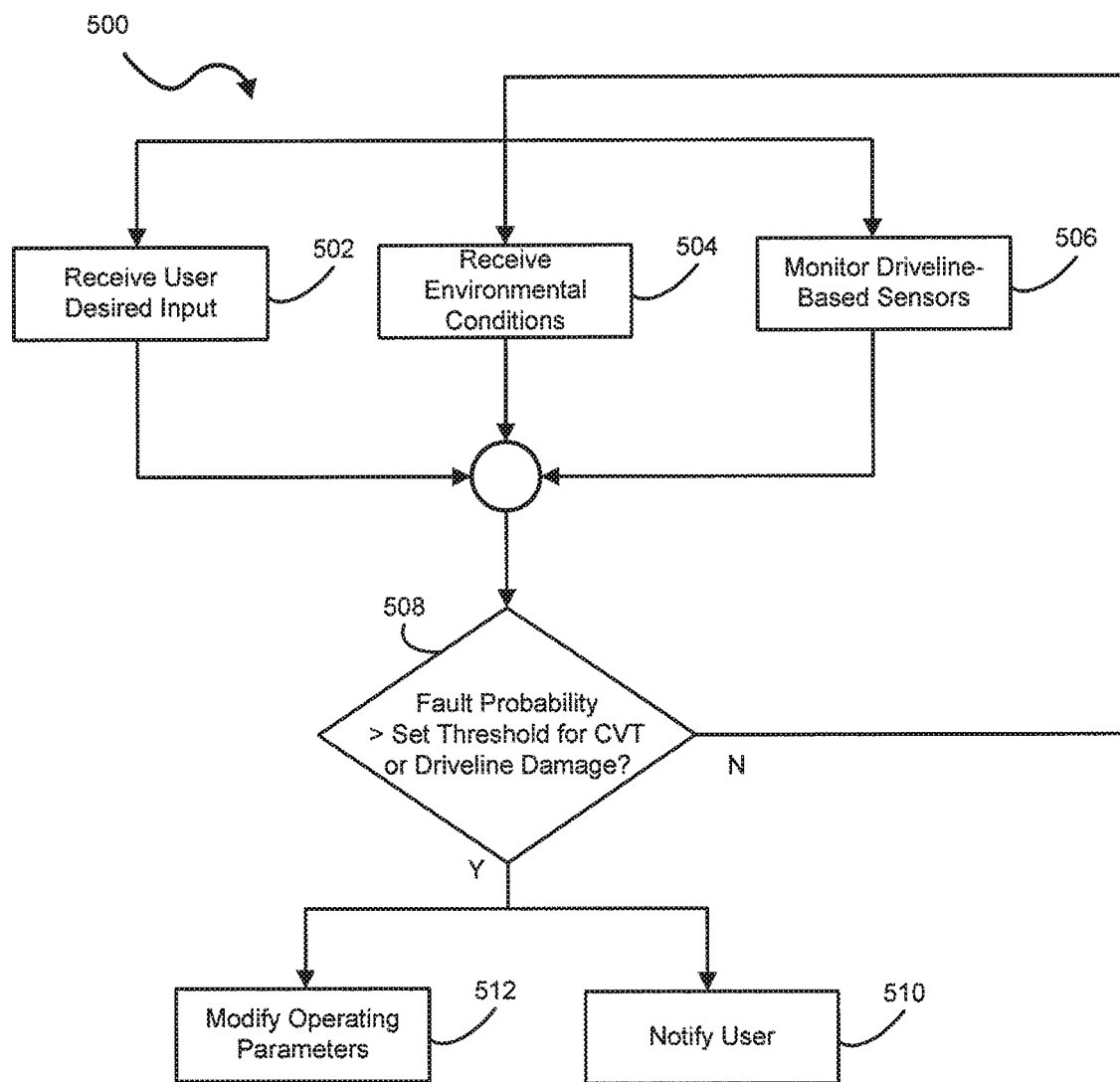
FIG. 5 illustrates an exemplary processing sequence of executing the present diagnostic system for detecting the belt slipping event in a proactive control mode.

FIG. 5 illustrates an exemplary processing sequence of the belt slipping event detection logic 500 of the diagnostic system 300 in a proactive control mode. In the proactive control mode, the diagnostic system 300 proactively notifies the user of an impending fault of the drive belt 206 or automatically adjusts at least one of the operating parameters before the potential CVT or driveline damage occurs. For example, when the diagnostic system 300 determines that a probability of having the fault is approaching approximately 90%, the alert circuit 326 automatically adjusts the at least one operating parameter to remove or lessen the effect of the impending fault of the vehicle 100 without interruption.

In the illustrated embodiment, it is preferred that steps 502, 504, and 506 are performed simultaneously, but each step may be performed separately or individually independent from each other. In step 502, the monitoring circuit 322 receives the desired vehicle input signal or parameter from the user. In step 504, the monitoring circuit 322 receives the environmental condition parameter or signal from the vehicle 100. In step 506, the monitoring circuit 322 monitors the at least one driveline-based parameter.

In step 508, the detection circuit 324 detects the belt slipping event based on the comparison of at least one of the user desired vehicle input signal, the environmental condition signal, and the driveline-based parameter with the predetermined threshold for predicting potential damage related to the drive belt 206 of the CVT 122 or the output driveline of the transmission 130. Any combinations of the user desired vehicle input signal, the environmental condition signal, and the driveline-based parameter are considered to detect the belt slipping event. For example, when a desired throttle position percentage is at 20%, a rotational speed ratio between the drive shaft 120 and the driven shaft 128 is 4:1, and an engine load is at 10-20% for a predetermined time period, e.g., 5 seconds, then the belt slipping event is likely to occur. As another example, when the desired throttle position percentage is at 50%, the rotational speed ratio between the drive shaft 120 and the driven shaft 128 is 7:1, and the engine load is at approximately 50% or greater for a predetermined time period, e.g., 1 second, then the belt slipping event may be imminent. When a probability of having the fault of the drive belt 206 is greater than a predetermined threshold (e.g., 90%), control proceeds to at least one of step 510 and step 512 depending on the application. Otherwise, control returns to steps 502, 504, and 506.

It is preferred that steps 510 and 512 are performed simultaneously, but each step may be performed separately or individually independent from each other. In step 510, the alert circuit 326 generates the information signal INFO based on the detected belt slipping event to inform the user of the impending fault of the drive belt 206 before potential belt or driveline damage occurs. Similarly, in step 512, the alert circuit 326 automatically adjusts or modifies at least one of the operating parameters before the impending fault of the drive belt 206 to prevent or lessen the potential CVT or driveline damage. For example, the alert circuit 326 automatically reduces the throttle position percentage by a predetermined rate (e.g. 10% thereby reducing the throttle position percentage from 50% to 40%) to avoid the impending fault of the drive belt 206.

Figure 6:
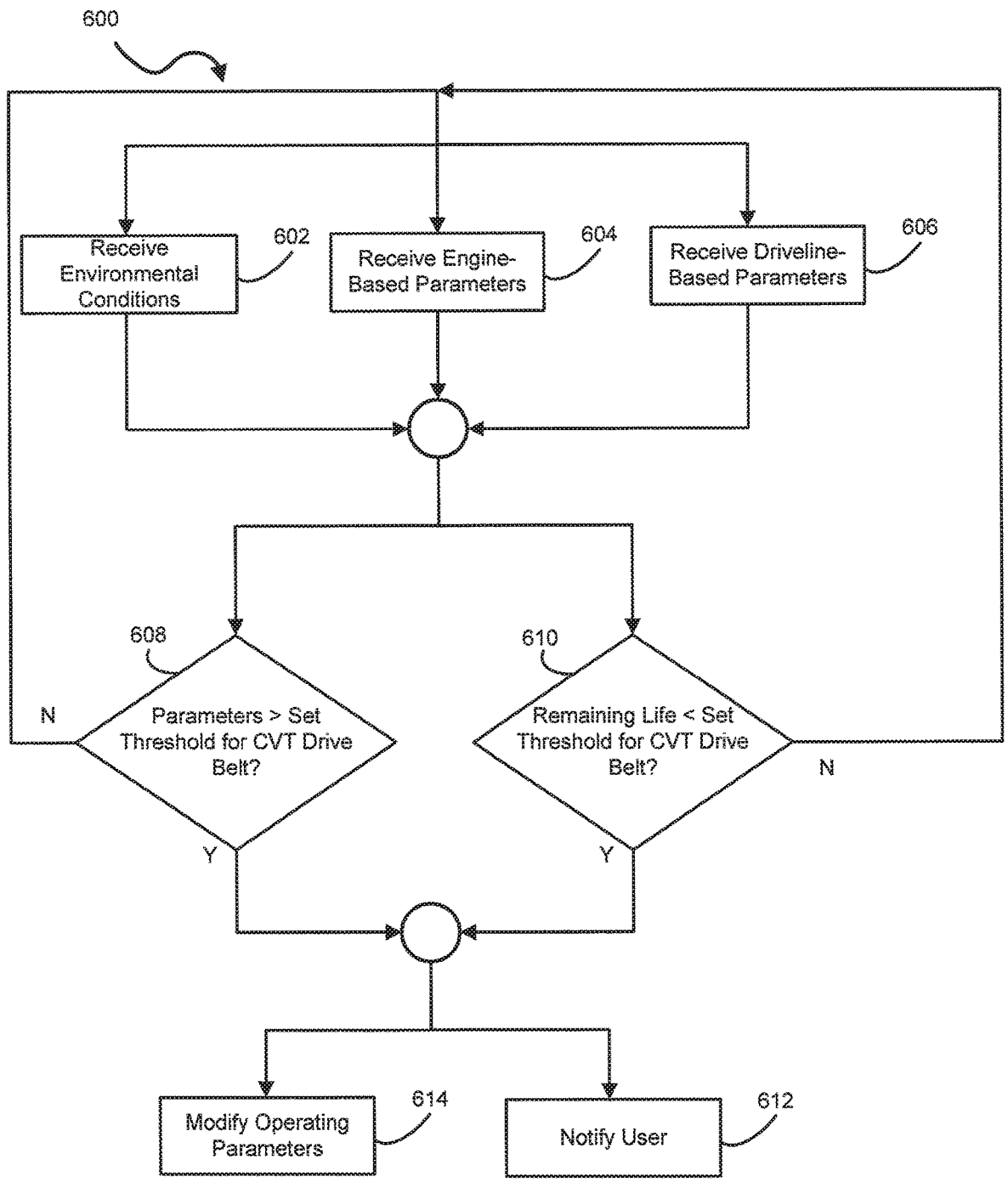
FIG. 6 illustrates an exemplary processing sequence of executing the present diagnostic system for detecting a critical belt life event.

FIG. 6 illustrates an exemplary processing sequence of a critical belt life event detection logic 600 of the diagnostic system 300. The critical belt life event is one of the triggering events detected by the detection circuit 324, and is triggered based on a temperature parameter related to the drive belt 206 of the CVT 122.

Based on the temperature parameter received from the temperature sensor 312 configured to measure temperature of the drive belt 206 or air temperature of the CVT 122, the detection circuit 324 provides an earlier detection of the critical belt life event for avoiding an overheat condition of the drive belt. Consequently, the longevity and durability of the drive belt 206 may be increased.

In step 602, the monitoring circuit 322 receives and monitors the environmental condition parameters or signals from the sensor 160, such as the temperature signal from the temperature sensor 312 configured to measure temperature of vehicle components, e.g., the drive belt 206 or the air intake or exhaust system 124, 126 of the CVT 122. For example, a drive belt temperature or a CVT air outlet temperature is measured by one or more temperature sensors 312.

In step 604, the monitoring circuit 322 receives and monitors the at least one engine-based parameter related to the engine load signal, the throttle position signal, the engine torque signal, the engine power signal, or the like. Other exemplary engine-based parameters include parameters related to a clutch ratio, a gear selection or position of the transmission, an intake pressure, an intake temperature, a driveline speed, an ECU clock, and the like, as received from each corresponding sensor 160.

In step 606, the monitoring circuit 322 receives and monitors the at least one driveline-based parameter, such as the vehicle speed parameter from the vehicle speed sensor 316 or the engine speed parameter from the engine speed sensor 318. In certain embodiments, a wheel speed sensor is also used to monitor the speed parameter.

In step 608, the detection circuit 324 detects the critical belt life event based on a comparison of at least one of the engine-based, driveline-based, and environmental condition parameters with a predetermined threshold for predicting a remaining life of the drive belt 206 of the CVT 122. When the at least one of the engine-based, driveline-based, and environmental condition parameters is greater than the predetermined threshold, control proceeds to at least one of step 612 and step 614. Otherwise, control returns to steps 602, 604, and 606.

For example only, the critical belt life event F(life) may be defined by a function of time and at least one of the engine-based, driveline-based, and environmental parameters, as provided by expression (2):

$$F(\text{life}) = \text{Remainer} - T \cdot \text{Parm} \quad (2)$$

wherein T denotes a time period, Parm denotes the at least one of the engine-based, driveline-based, and environmental condition parameters, and Remainer denotes a remaining life time period left for the drive belt 206. As an example, the critical belt life event may be detected by the detection circuit 324 when the belt temperature exceeding a predetermined threshold (e.g., greater than 250° F.) continues for a predetermined time period (e.g., 10-15 minutes), or a remaining life of the drive belt 206 is less than a minimum life time threshold. In one embodiment, the minimum life time threshold is determined by at least one of a belt temperature, a belt speed, and a belt load. As an example only, when the belt temperature is at 250° F. for 15 minutes, the remaining life time period is approximately 150 hours, but when the belt temperature is at 330° F. for 10 minutes, the remaining life time period is approximately 10 hours. The belt temperature (or the belt speed or load) and the belt life time period have an inverse relationship such as a negative exponential slope on a graph. As such, the remaining life time period can also be similarly calculated based on the belt speed and the belt load to suit different applications.

As such, a thermal degradation of the drive belt 206 is predicted by the detection circuit 324.

In step 610, when the detection circuit 324 detects that the remaining life of the drive belt 206 is less than the minimum life time threshold (e.g., 10% remaining life left), control proceeds to at least one of step 612 and step 614 (or simultaneously to both steps 312 and 314) depending on the application. Otherwise, control returns to steps 602, 604, and 606.

In step 612, the alert circuit 326 generates the information signal INFO based on the detected triggering event to inform the user using the display 165. For example, the information signal INFO is displayed by the display circuit 330 using a dashboard light or an audible signal including a textual or graphical indicator (e.g., ° F./° C. belt temperature reached (or to be reached), miles-to-belt-failure, % belt life remaining, or % belt life used) on the display 165, requesting maintenance of the drive belt 206. Other suitable audio, visual, or tactile indicators are also contemplated.

In step 614, the alert circuit 326 automatically adjusts or modifies at least one of the operating parameters, such as the environmental condition parameters, the engine-based parameters, or the driveline-based parameters, based on the calibration table 334 stored in the database 304 to prevent or lessen the potential CVT drive belt failure. For example, when the detection circuit 324 identifies the critical belt life event, the alert circuit 326 automatically reduces the vehicle speed by a predetermined value. Other suitable adjustments or modifications of the operating parameters are contemplated to suit different applications.

Figure 7:
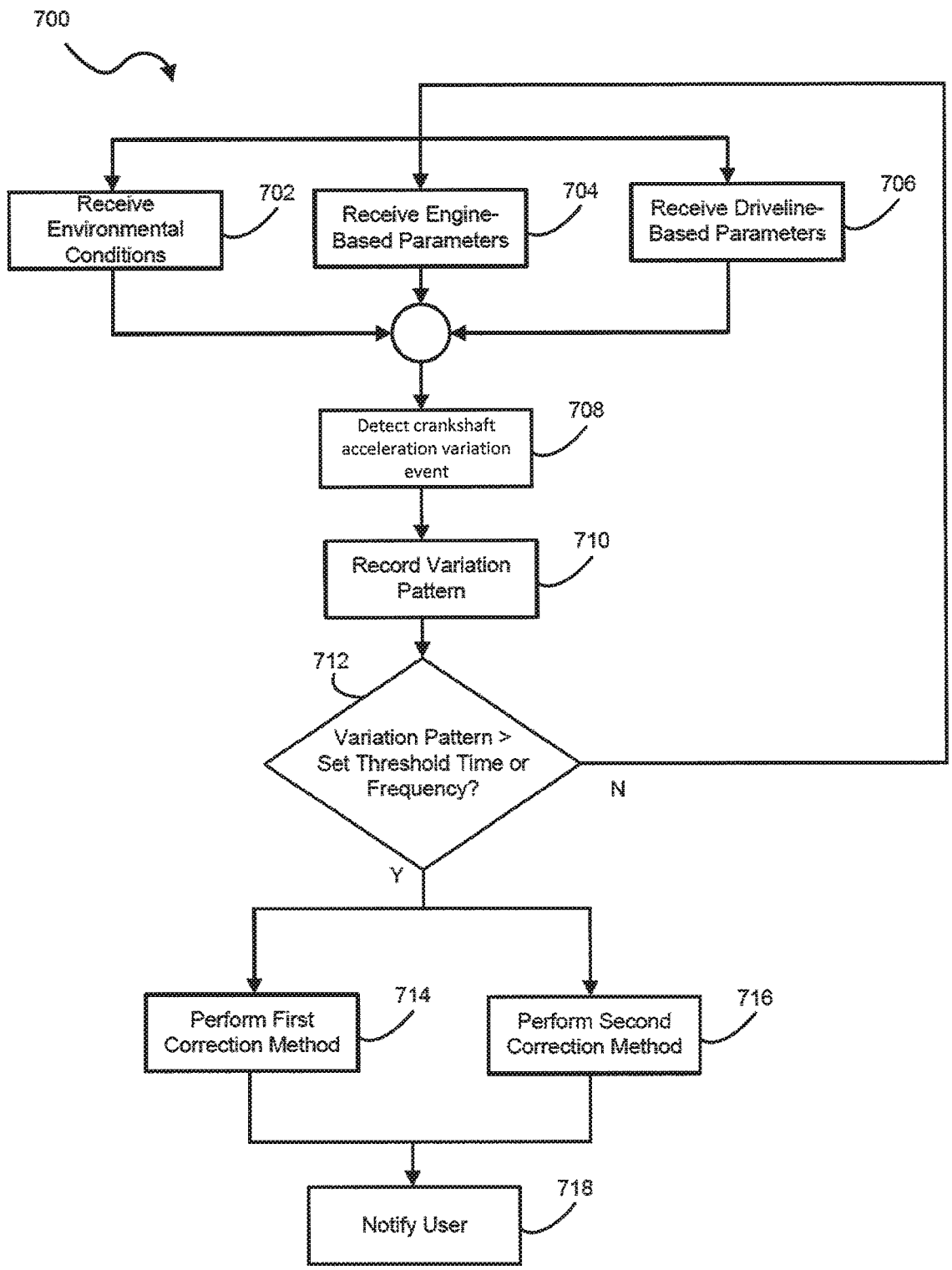
FIG. 7 illustrates an exemplary processing sequence of executing the present diagnostic system for detecting an engine misfire event.

FIG. 7 illustrates an exemplary processing sequence of an engine crankshaft acceleration variation event detection logic 700 of the diagnostic system 300. The engine crankshaft acceleration variation event is one of the triggering events detected by the detection circuit 324, and is triggered based on a variation pattern of at least one operating parameter measured during a predetermined time period. It is contemplated that the parameter variation pattern is monitored and detected based on historical information of a comparative logic or algorithm.

During operation, the engine crankshaft acceleration variation event may be perceived to be caused by the belt slipping event described above, or an improper firing sequence event of the power source 106. Engine crankshaft acceleration variation event detection logic 700 distinguishes the belt slipping event from an engine combustion misfire event. Thus, it is advantageous that the present method improves the diagnosis of the fault of the drive belt 206 without regard to a combustion misfire signal.

In step 702, the monitoring circuit 322 receives and monitors the environmental condition parameter or signal from the vehicle 100, such as a fuel state signal (e.g., fuel ON/OFF) from the fuel sensor 320 or an engine coolant temperature signal from the temperature sensor 312. Other exemplary environmental condition signals include a drive belt temperature signal, a clutch state signal, or the like. For example, the clutch state signal may indicate a fully engaged state, a partially engaged state, or a non-engaged state. Also, a sheave position signal may be used as one of the environmental condition signals.

In one embodiment, the belt slipping event can be ignored within a predetermined tolerance range when the crankshaft acceleration signal is less than a predetermined lower threshold. However, the belt slipping event cannot be ignored when the crankshaft acceleration signal is greater than a predetermined upper threshold (i.e., when the vehicle or engine speed reaches a predetermined threshold), and the vehicle 100 is decelerating from a current speed down to a lesser speed. If the fuel state signal is OFF during the deceleration, an initial predetermined time period may be the best time period for which the belt slipping event can be detected.

In step 704, the monitoring circuit 322 receives and monitors the at least one engine-based parameter related to the crankshaft acceleration signal, the engine torque signal, the transmission gear position signal, or the like. Other exemplary engine-based parameters include parameters related to a clutch ratio, a gear selection or position, an intake pressure, an intake temperature, a driveline speed, an ECU clock, and the like, as received from each corresponding sensor 160.

In step 706, the monitoring circuit 322 receives and monitors the at least one driveline-based parameter, such as the vehicle speed parameter from the vehicle speed sensor 316 or the engine speed parameter from the engine speed sensor 318. In one embodiment, a wheel speed signal received from the wheel speed sensor is also used to monitor the speed parameter.

In step 708, the detection circuit 324 detects the engine crankshaft acceleration variation event based on a variation pattern of at least one operating parameter measured during a predetermined time period. For example, the engine crankshaft acceleration variation event is detected by measuring an acceleration or deceleration rate of the crankshaft acceleration signal based on a crankshaft rotation angle (e.g., at each 90°, 180°, or 270°). When a time-windowed acceleration or deceleration rate of the crankshaft acceleration signal is greater than a predetermined threshold, an initial detection of the variation pattern is recognized by the detection circuit 324. In one embodiment, the time-windowed acceleration or deceleration rate is not needed to be measured in an entire cycle of the engine.

In step 710, after the initial detection of the variation pattern, the detection circuit 324 records or stores data related to the variation pattern at a predetermined time interval (e.g., at each engine cycle) in the database 304 for subsequent comparison. In step 712, when a frequency of the variation pattern is greater than a predetermined threshold, the variation pattern lasts longer than a predetermined time period, or any combination of the frequency and the pattern time period is greater than a predetermined threshold (or time period), control proceeds to at least one of step 714 and step 716. Otherwise, control returns to steps 702, 704, and 706.

For example only, the engine crankshaft acceleration variation event F(ecav) may be defined by a function of parameter variation pattern, time period (or frequency) and at least one of the engine-based, driveline-based, and environmental parameters, as provided by expression (3):

$$F(ecav)=Pattern\cdot(T|Freq)\cdot Parm \quad (3)$$

wherein Pattern denotes a parameter variation pattern, T denotes a time period, Freq denotes a frequency of the parameter variation pattern, and Parm denotes the at least one of the engine-based, driveline-based, and environmental condition parameters. In one embodiment, when a predetermined variation pattern of the crankshaft acceleration signal is detected, and the detected variation pattern lasts for a predetermined time period, or repeats a predetermined number of times, the engine crankshaft acceleration variation event is detected by the detection circuit 324. For example, when the engine is in an off throttle or zero fueling event, during a 1 second deceleration time period, the engine may be reducing speed from 3500 to 2500 RPM. In this case, an undamaged belt would have approximately 100 detectable engine compression or inertially induced crank shaft accelerations or decelerations. In contrast, a belt with a damaged section would have approximately an additional 8 to 30 detectable crankshaft acceleration or decelerations.

It is preferred that the alert circuit 326 selectively performs step 714 or 716 depending on the application. Specifically, in step 714, when a single occurrence of the engine crankshaft acceleration variation event is detected, the alert circuit 326 performs a first or fast correction method for determining whether the engine crankshaft acceleration variation event is caused by the belt slipping event or the engine combustion misfire event. In one embodiment, the time-windowed acceleration or deceleration rate is determined based on a vehicle speed, a transmission state, a coolant temperature, and a clutch state.

As an example only, when the engine crankshaft acceleration variation event is detected during a shorter time period (e.g., 2-10 milliseconds) and the fuel state signal is OFF or the engine speed is low (e.g., 100 RPM), the engine combustion misfire event is not occurring but the belt slipping event is in progress. In another embodiment, when the engine crankshaft acceleration variation event is detected and a negative torque is detected, when the engine is producing less torque than required to idle, the vehicle 100 is decelerating. During the deceleration, if the drive belt 206 is not fully engaged, the belt slipping event is likely to occur. Thus, it is advantageous that the accurate diagnosis of the exact cause of the engine crankshaft acceleration variation event is achieved by the first or fast correction method.

In step 716, when a plurality of occurrences of the engine crankshaft acceleration variation events are detected, the alert circuit 326 performs a second or slow correction method for determining whether the engine crankshaft acceleration variation event is caused by the belt slipping event or the engine combustion misfire event. For example, when multiple engine crankshaft acceleration variation events are detected during a longer time period (e.g., 2-60 seconds) (alternatively, the time period may be a couple of minutes) and the engine torque is high during the time period, the belt slipping event is in progress, not the engine combustion misfire event. In one embodiment, the belt slipping event is investigated based on scenarios wherein one of fuel off, low torque, and high torque are identified. During a fuel off scenario, if there is a variation in the crankshaft signal then the engine crankshaft acceleration variation event is classified as a belt slipping event. During a low torque scenario, if a magnitude variation in crankshaft signal is above a certain threshold then the engine crankshaft acceleration variation event is classified as a belt slipping event. During a high engine torque scenario, the engine crankshaft acceleration variation event will be classified as an engine combustion misfire event. In one example, if the engine crankshaft acceleration variation event cannot be classified as a belt slipping event, it is classified as an engine combustion misfire event. In one example, if an engine combustion misfire event is found, then the fuel injector to the cylinder that has misfired is deactivated. As with the first correction method, it is advantageous that the accurate diagnosis of the engine crankshaft acceleration variation event is achieved by the second or slow correction method.

In step 718, the alert circuit 326 generates the information signal INFO based on the detected triggering event to inform the user using the display 165. For example, the information signal INFO is displayed on the display 165 for warning the user of an occurrence of the belt slipping event based on the detected engine crankshaft acceleration variation events.

Figure 8:
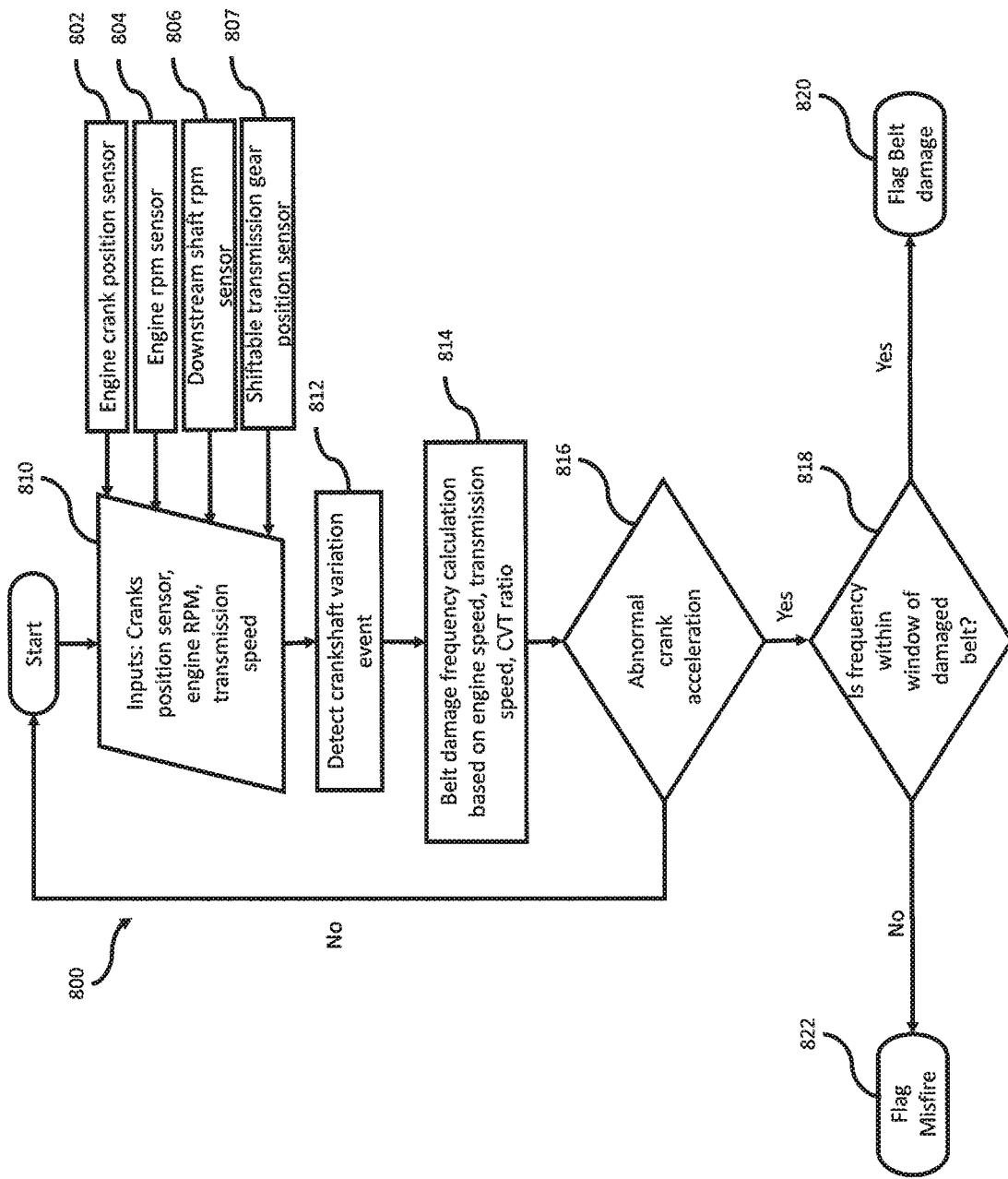
FIG. 8 illustrates an exemplary processing sequence of executing the present diagnostic system for detecting an engine misfire event or an damaged belt event.

One example of an engine crankshaft acceleration variation event being classified as either a belt slipping event or an engine misfire event is provided in FIG. 8. Turning to FIG. 8, an engine crankshaft acceleration variation event detection logic 800 is provided.

Monitoring circuit 322 monitors an engine crank position value with an input from an engine crank position sensor 802, an engine rpm value with an input from an engine rpm sensor 804, and a shiftable transmission input shaft rpm value with an input from a downstream rpm sensor 806, as represented by block 810. Exemplary downstream rpm sensors 806 are positioned to determine the rotational speed of a shaft that ultimately is drive by the output shaft of the CVT such as an input shaft of a a shiftable transmission, a output shaft of the shiftable transmission, a wheel speed sensor, and a half shaft. If the shaft being monitored by sensor 806 is the output shaft of a shiftable transmission or downstream from a shiftable transmission, a gear position sensor 807 (see FIG. 8) is also included to indicate the gear ratio of the shiftable transmission. Based on the monitored values, detection circuit 324, detects a crankshaft acceleration variation event, as represented by block 812. The crankshaft acceleration variation event is detected by measuring an acceleration or deceleration rate of the crankshaft acceleration signal based on a crankshaft rotation angle (e.g., at increments of rotation, such as every 1°, 2°, 5°, 10°, 30°, and 90°) which may be determined based on the engine crankshaft position sensor 802 and the engine rpm sensor 804. Exemplary crankshaft acceleration variation events include engine misfire events and CVT damaged belt events, both of which exhibit a repeating pattern over time.

Processing sequence 800 determines an interaction frequency that would be associated with a damaged CVT belt, as represented by block 814. Detection circuit 324 monitors for an observed time-windowed acceleration or deceleration rate of the crankshaft acceleration signal, as represented by block 816. If an observed crankshaft acceleration variation event is detected, the frequency of the observed crankshaft acceleration variation event is compared to the determined interaction frequency of a damaged CVT belt by alert circuit 326, as represented by block 818. If the observed crankshaft acceleration variation event frequency is within a first threshold amount of the determined interaction frequency of a damaged CVT belt, the observed crankshaft acceleration variation event is classified as a CVT damaged belt event, as represented by block 820. Otherwise the observed crankshaft acceleration variation event is classified as an engine misfire event, as represented by block 822. In either case, alert circuit 326, provides an indication to the operator of the vehicle of the condition. Alternatively, in the case of an engine misfire event, the fuel to the cylinder which is misfiring is stopped or the fuel and spark to the cylinder which is misfiring is stopped. The provision of fuel or fuel and spark to the cylinder is reset at the next key restart of the vehicle.

In one embodiment, the first threshold amount is an absolute amount in Hertz, such as 100 Hertz. In another embodiment, the first threshold amount is a percentage amount. An exemplary percentage is within about 10 percent above or below the determined interaction frequency of a damaged CVT belt. In embodiments, the observed crankshaft acceleration variation event frequency is compared to both the determined interaction frequency of a damaged CVT belt and to a multiple of the determined interaction frequency of a damaged CVT belt.

Figure 9:
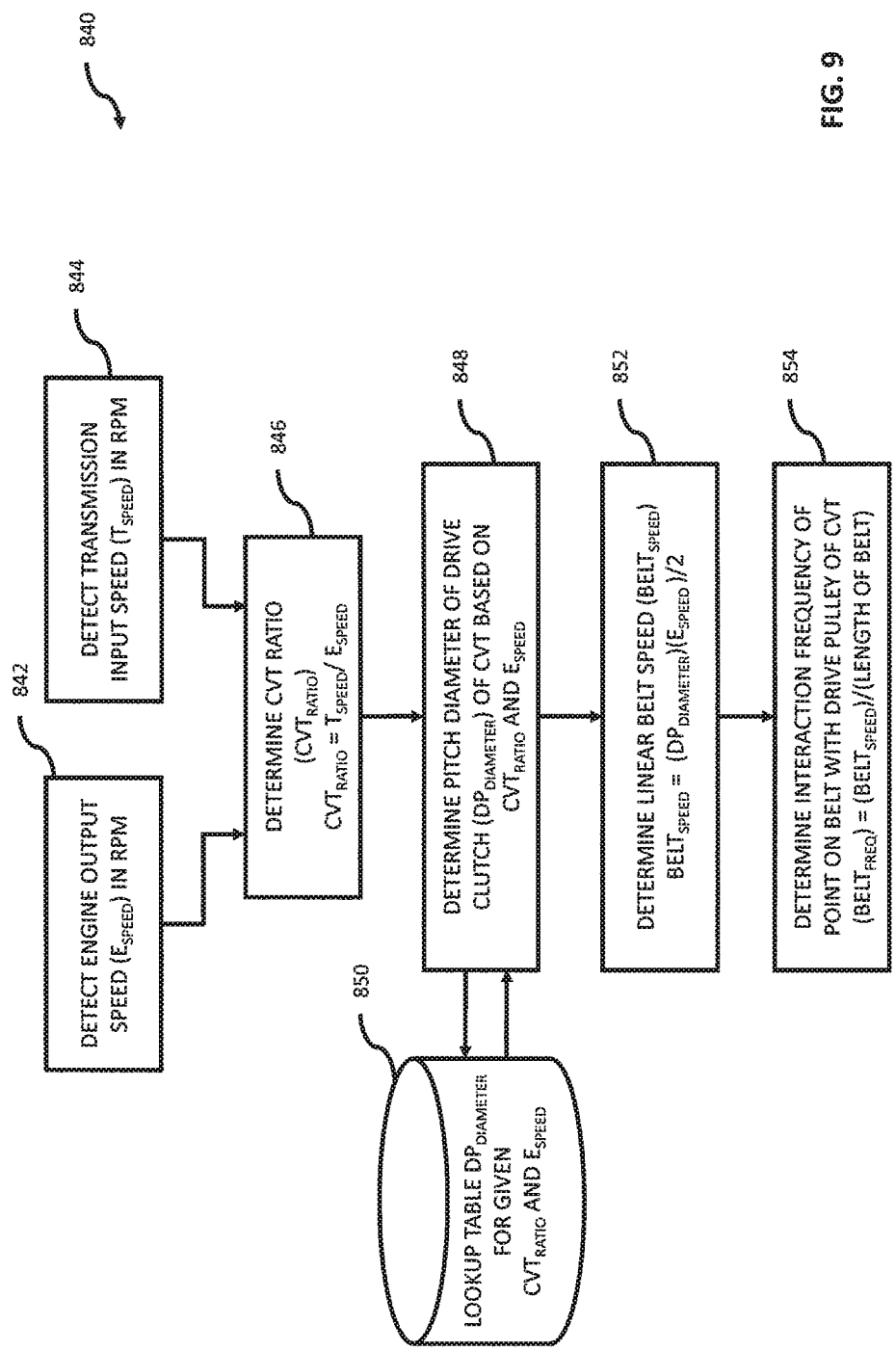
FIG. 9 illustrates an exemplary processing sequence of determining a interaction frequency of the CVT belt.

Referring to FIG. 9, an exemplary processing sequence 840 for determining the interaction frequency of a damaged CVT belt is illustrated. Detection circuit 324 detects the engine output speed ($E_{SPEED}$) from engine rpm sensor 804, as represented by block 842 and detects the transmission input shaft speed ($T_{SPEED}$) from transmission input shaft rpm sensor 806, as represented by block 844. A CVT ratio ($CVT_{RATIO}$) of the CVT is determined based on the detected engine output speed and the transmission input speed, as represented by block 846.

Based on the determined CVT ratio ($CVT_{RATIO}$) and the detected engine output speed ($E_{SPEED}$), a pitch diameter ($DP_{DIAMETER}$) of drive clutch 202 of CVT 200 is determined, as represented by block 848. The pitch diameter ($DP_{DIAMETER}$) corresponds to the diameter on drive clutch 202 that drive belt 206 is riding upon. As is understood in the art, the spacing between the sheaves 208, 210 is adjustable resulting in drive clutch 202 having many possible pitch diameters. In one example, diagnostic circuit 302 references a lookup table 850 provided in database 304 to determine the pitch diameter of drive clutch 202. Diagnostic circuit 302 provides the determined CVT ratio ($CVT_{RATIO}$) and detected engine speed ($E_{SPEED}$) as inputs to the lookup table 850, which returns a pitch diameter ($DP_{DIAMETER}$) associated with the provided determined CVT ratio ($CVT_{RATIO}$) and detected engine speed ($E_{SPEED}$). In one example, diagnostic circuit 302 selects a pitch diameter ($DP_{DIAMETER}$) from lookup table 850 that has the closest corresponding determined CVT ratio ($CVT_{RATIO}$) and detected engine speed ($E_{SPEED}$).

Based on the determined pitch diameter ($DP_{DIAMETER}$), diagnostic circuit 302 determines a linear belt speed of CVT belt 206 ($BELT_{SPEED}$), as represented by block 852. The linear belt speed of CVT belt 206 ($BELT_{SPEED}$) and a known length of CVT belt 206, are used by diagnostic circuit 302 to determine an interaction frequency ($BELT_{FREQ}$) of a point on CVT belt 206 with drive clutch 202, as represented by block 854. If CVT belt 206 has a damaged area, the damaged area will interact with drive clutch 202 at the determined frequency from block 854 referred to as the interaction frequency of a damaged CVT belt ($BELT_{FREQ}$). Exemplary belt damages include spin burn damage, a missing cog on the CVT belt, and a cord pop-out.

Figure 10:
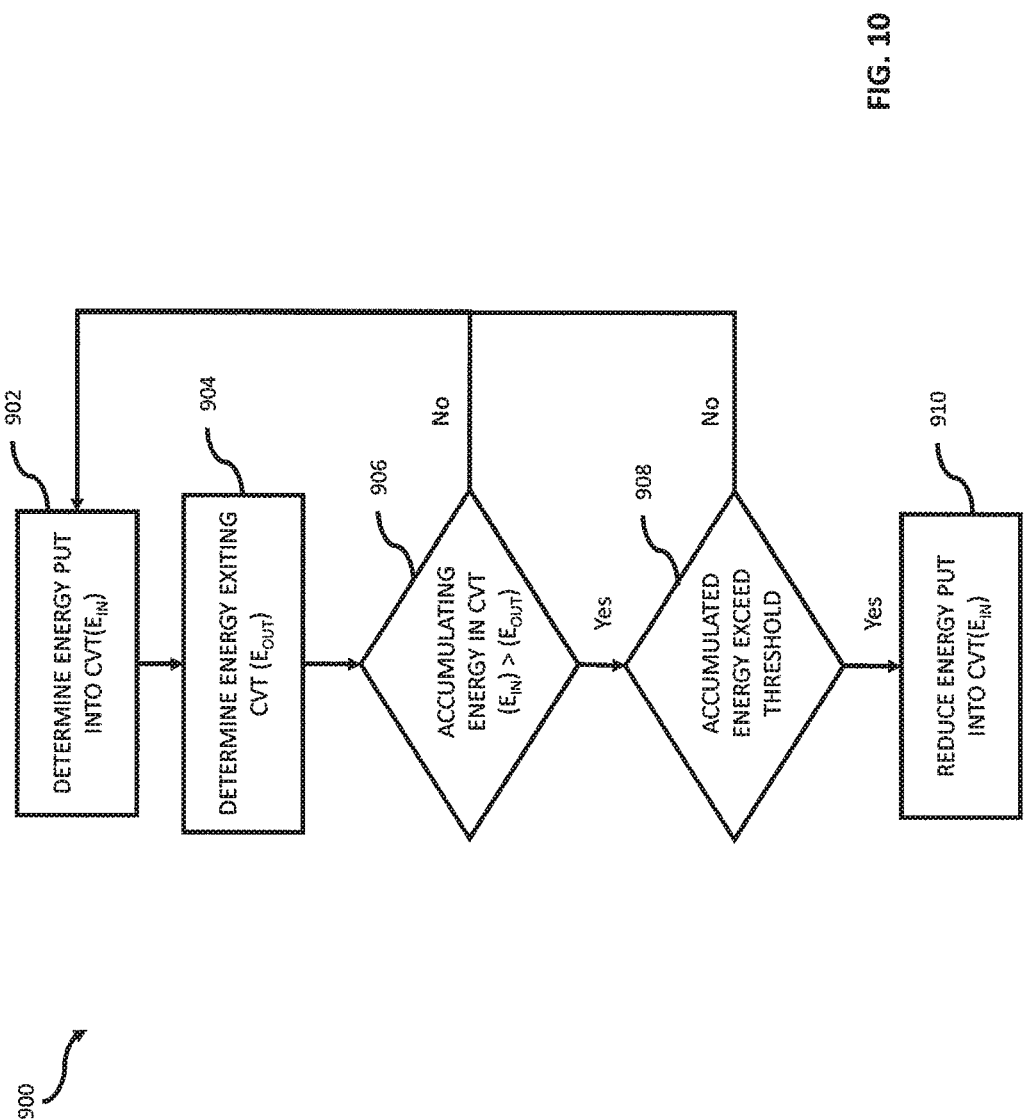
FIG. 10 illustrates an exemplary processing sequence of regulating peak output power of a power source based on accumulated energy in a CVT.

Referring to FIG. 10, an exemplary processing sequence 900 is illustrated. Processing sequence 900 adjusts a peak output power of a power source 10 based on a determination that excessive energy is accumulating within CVT 200.

Diagnostic circuit 302 determines an amount of energy input into CVT 200 ($E_{IN}$), as represented by block 902. Diagnostic circuit 302 further determines an amount of thermal energy exiting CVT 200 ($E_{OUT}$), as represented by block 904. In one embodiment, the energy input into CVT 200 is determined based on mechanical efficiencies of the CVT and mechanical power put into CVT 200 while the energy exiting the CVT is determined based on thermal characteristics of the air flowing through CVT 200.

Diagnostic circuit 302 compares the energy into CVT 200 ($E_{IN}$) and the thermal energy exiting CVT 200 ($E_{OUT}$) to determine if energy is accumulating within CVT 200, as represented by block 906. Energy accumulating within CVT 200 results in a rise in the temperature of belt 206 of CVT 200. Energy is accumulating within CVT 200 when ($E_{OUT}$) is less than ($E_{IN}$).

If energy is accumulating within CVT 200, diagnostic circuit 302 compares the amount of accumulated energy to a threshold level, as represented in block 908. If the amount of accumulated energy exceeds the threshold level, diagnostic circuit 302 causes a reduction in the energy put into CVT 200 ($E_{IN}$), as represented by block 910, such as by reducing the peak output power of the power source 106 or the peak output torque of the power source 106. In one embodiment, the reduction in peak output power of power source 106 is gradual to avoid a rapid decline in the peak output power of power source 106.

To cause the reduction in peak output power of power source 106 diagnostic circuit 302 sends a message to the ECC 162 of power source 106. An exemplary message is a CAN message over a CAN network bus. Alternatively, if diagnostic circuit 302 is part of ECC 162 as illustrated in FIG. 3, diagnostic circuit 302 directly limits the peak output power of power source 106.

Figure 11:
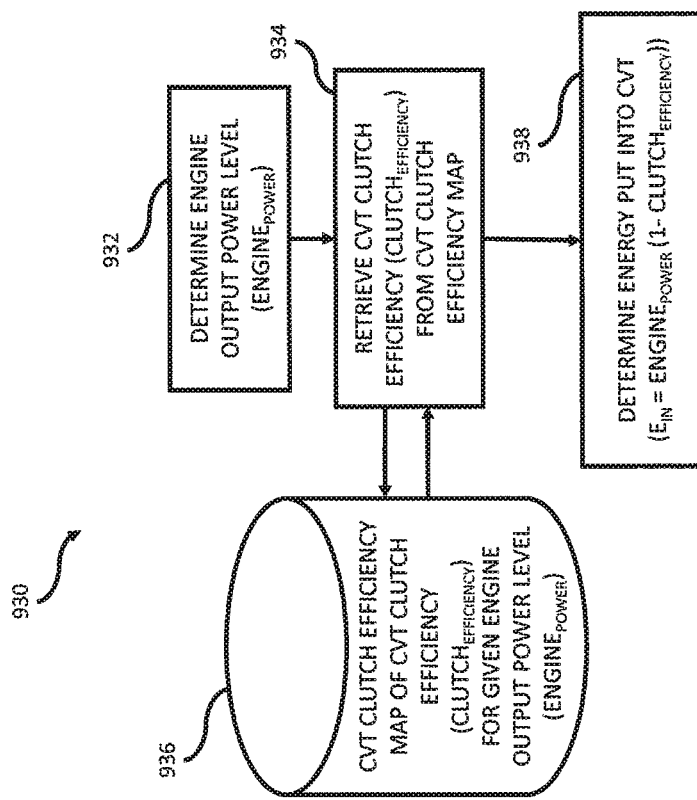
FIG. 11 illustrates an exemplary processing sequence for determining an amount of energy input into a CVT during operation of the CVT.

Referring to FIG. 11, an exemplary processing sequence 930 for determining an amount of energy into CVT 200 ($E_{IN}$) is illustrated. Diagnostic circuit 302 determines the power source 106, illustratively an internal combustion engine, output power level ($ENGINE_{POWER}$), as represented by block 932. In one example, the output power level ($ENGINE_{POWER}$) is determined for example by engine calculated torque output multiplied by the engine speed. Diagnostic circuit 302 then retrieves a CVT clutch efficiency ($CLUTCH_{EFFICIENCY}$) from a CVT clutch efficiency map or lookup table 936, as represented by block 934.

The CVT clutch efficiency map has different efficiency values for corresponding output power levels ($ENGINE_{POWER}$). In one example, diagnostic circuit 302 selects a CVT clutch efficiency ($CLUTCH_{EFFICIENCY}$) from lookup table 936 that has the closest corresponding determined output power level ($ENGINE_{POWER}$). The CVT clutch efficiency is an estimate of the percentage of energy passing from the drive shaft 120 associated with CVT 200 to the driven shaft 128 associated with CVT 200. The remainder of the energy is assumed to be retained in the interior of CVT 200 as heat. Diagnostic circuit 302 determines the energy put into CVT 200 ($E_{IN}$) from the product ($ENGINE_{POWER}$) and the quantity of ($1-CLUTCH_{EFFICIENCY}$), as represented by block 938.

Figure 12:
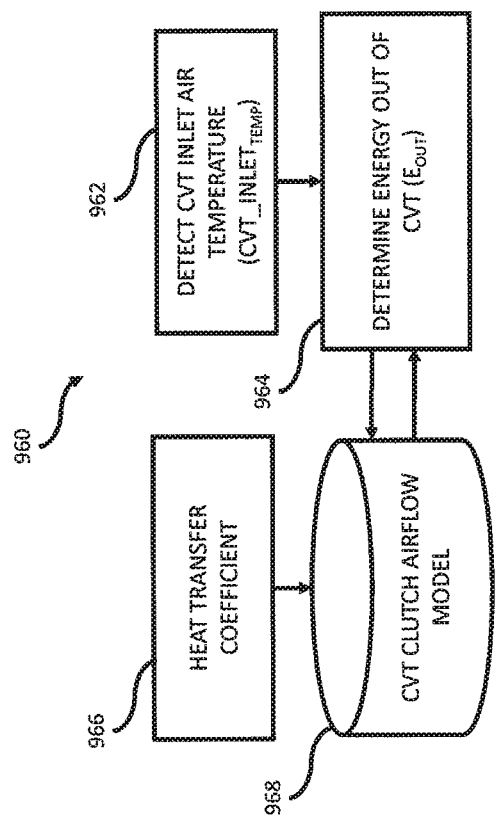
FIG. 12 illustrates an exemplary processing sequence for determining an amount of energy exiting a CVT during operation of the CVT.

Referring to FIG. 12, an exemplary processing sequence 960 for determining an amount of energy out of CVT 200 ($E_{OUT}$) is illustrated. Diagnostic circuit 302 determines an air temperature of the air entering the interior of CVT 200 through air supply conduits 230, as represented by block 962. Based on this temperature reading and a heat transfer coefficient 966, diagnostic circuit 302 determines the amount of energy out of CVT 200 ($E_{OUT}$) based on a CVT clutch airflow model 968, as represented by block 964. The CVT clutch airflow model is based on engine speed (sensor 804), downstream driveline shaft speed (sensor 806), gear position (sensor 807), and altitude of the vehicle. The altitude of the vehicle may be determined based on a barometric pressure measured by a barometric pressure sensor or based on a location value provided by a GPS system. In one embodiment, an exit temperature of the airflow in exhaust conduit 238 is also monitored and is used to determine the energy out of the CVT 200.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A vehicle diagnostic method of a vehicle including an internal combustion engine and a continuously variable transmission (CVT) operatively coupled to the internal combustion engine, the method comprising the steps of:
   detecting at least one engine crankshaft acceleration variation event of the vehicle using a detection circuit;
   determining at least one operating parameter received from one or more sensors associated with an operation of the CVT using a monitoring circuit; and
   determining based on the at least one operating parameter when the at least one detected engine crankshaft acceleration variation is related to a fault of the drive belt of the CVT using an alert circuit.

2. The diagnostic method of claim 1, further comprising including an environmental condition parameter as the at least one operating parameter, wherein the environmental condition parameter includes at least one of a fuel state signal, an engine coolant temperature signal, a drive belt temperature signal, and a clutch state signal.

3. The diagnostic method of claim 1, further comprising including an engine-based parameter as the at least one operating parameter, wherein the engine-based parameter is related to at least one of a crankshaft acceleration signal, an engine torque signal, and a transmission gear position signal.

4. The diagnostic method of claim 1, further comprising including a driveline-based parameter as the at least one operating parameter, wherein the driveline-based parameter is related to at least one of a vehicle speed signal, an engine speed signal, and a wheel speed signal.

5. The diagnostic method of claim 1, further comprising detecting the at least one engine crankshaft acceleration variation event by measuring an acceleration or deceleration rate of a crankshaft acceleration signal.

6. The diagnostic method of claim 1, further comprising performing a first correction method for determining whether the engine crankshaft acceleration variation event is caused by a belt slipping event or an engine combustion misfire event based on a single occurrence of the at least one engine crankshaft acceleration variation event.

7. The diagnostic method of claim 1, further comprising performing a second correction method for determining whether the engine crankshaft acceleration variation event is caused by a belt slipping event or an engine combustion misfire event based on a plurality of occurrences of the at least one engine crankshaft acceleration variation event.

8. The method of claim 1, wherein the step of detecting at least one engine crankshaft acceleration variation event of the vehicle using the detection circuit includes detecting a plurality of engine crankshaft acceleration variation events.

9. The method of claim 8, further comprising the steps of
   determining a frequency of the plurality of engine crankshaft acceleration variation events;
   determining a CVT belt interaction frequency of a drive belt of the CVT; and
   classifying the plurality of engine crankshaft acceleration variation events as one of an engine misfire event and a CVT belt damage event based on a comparison of the frequency to the CVT belt interaction frequency.

10. The diagnostic method of claim 1, further comprising detecting the at least one engine crankshaft acceleration variation event based on a variation pattern of the operating parameter measured during a predetermined time period.

11. The diagnostic method of claim 10, further comprising determining whether a frequency of the variation pattern is greater than a predetermined threshold.

12. The diagnostic method of claim 10, further comprising determining whether a pattern time period of the variation pattern is greater than a predetermined time period.

13. The diagnostic method of claim 10, further comprising determining whether a magnitude of the variation pattern.

14. A vehicle diagnostic method of a vehicle including an internal combustion engine and a continuously variable transmission (CVT) operatively coupled to the internal combustion engine, the method comprising the steps of:
 determining at least one operating parameter received from one or more sensors associated with an operation of the CVT using a monitoring circuit;
 detecting at least one belt slipping event of a drive belt of the CVT using a detection circuit;
 determining based on the at least one operating parameter when the at least one detected belt slipping event is related to an impending fault of the drive belt of the CVT using an alert circuit; and
 notifying the impending fault of the drive belt before belt or driveline damage of the vehicle occurs using the alert circuit.

15. The diagnostic method of claim 14, further comprising generating an information signal related to the impending fault of the drive belt.

16. The diagnostic method of claim 14, further comprising providing an option to override a user input by adjusting at least one value of the at least one operating parameter.

17. The diagnostic method of claim 14, further comprising detecting the at least one belt slipping event by the detection circuit in at least one of a retroactive control mode and an active control mode.

18. The diagnostic method of claim 14, further comprising receiving a desired vehicle input parameter using the monitoring circuit.

19. The diagnostic method of claim 14, further comprising including an environmental condition parameter as the at least one operating parameter.

20. The diagnostic method of claim 14, further comprising including an engine-based parameter as the at least one operating parameter.

21. The diagnostic method of claim 14, further comprising including a driveline-based parameter as the at least one operating parameter.

22. The diagnostic method of claim 14, further comprising detecting the belt slipping event based on a comparison of an engine-based parameter and a driveline-based parameter for predicting the impending fault of the drive belt.

23. The diagnostic method of claim 22, further comprising determining whether at least one of the engine-based parameter and the driveline-based parameter is greater than a predetermined threshold.

24. The diagnostic method of claim 22, further comprising informing the at least one detected belt slipping event using a display; and automatically adjusting the at least one operating parameter based on a predetermined table.

25. A vehicle diagnostic method of a vehicle including an internal combustion engine and a continuously variable transmission (CVT) operatively coupled to the internal combustion engine, the method comprising the steps of:
 determining at least one operating parameter received from one or more sensors associated with an operation of the CVT using a monitoring circuit;
 detecting at least one critical belt life event of a drive belt of the CVT using a detection circuit;
 determining based on the at least one operating parameter when the at least one detected critical belt life event is related to a fault of the drive belt of the CVT using an alert circuit; and
 generating an information signal related to a life of the drive belt using the alert circuit.

26. The diagnostic method of claim 25, further comprising including an environmental condition parameter as the at least one operating parameter, wherein the environmental condition parameter includes a temperature signal.

27. The diagnostic method of claim 25, further comprising including an engine-based parameter as the at least one operating parameter, wherein the engine-based parameter is related to at least one of an engine load signal, a throttle position signal, an engine torque signal, and an engine power signal.

28. The diagnostic method of claim 25, further comprising including a driveline-based parameter as the at least one operating parameter, wherein the driveline-based parameter is related to at least one of a vehicle speed signal and an engine speed signal.

29. The diagnostic method of claim 25, further comprising adjusting at least one of an engine-based parameter, a driveline-based parameter, and an environmental condition parameter based on the at least one detected critical belt life event.

30. The diagnostic method of claim 25, further comprising detecting the critical belt life event based on a comparison of an engine-based parameter, a driveline-based parameter, and an environmental condition parameter; and predicting a remaining life of the drive belt based on the comparison.

31. The diagnostic method of claim 30, further comprising determining whether the remaining life of the drive belt is less than a predetermined threshold.

32. The diagnostic method of claim 30, further comprising displaying the information signal on a display using a textual or graphical indicator associated with the remaining life of the drive belt.

* * * * *